United States Patent
Wang et al.

(10) Patent No.: US 11,625,655 B2
(45) Date of Patent: Apr. 11, 2023

(54) WORKFLOWS WITH RULE-BASED ASSIGNMENTS

(71) Applicant: ServiceNow, Inc., Santa Clara, CA (US)

(72) Inventors: Ruoyu Wang, Santa Clara, CA (US); Scott Michael Rhodes, Torrance, CA (US); Tian Ye, San Carlos, CA (US); Harish Kumar Balachandra Bellamane, San Jose, CA (US); Yong Liang, Palo Alto, CA (US); Prithvi Yoganand, Dublin, CA (US); Surabhi Seetharam, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 282 days.

(21) Appl. No.: 16/709,708

(22) Filed: Dec. 10, 2019

(65) Prior Publication Data
US 2020/0151649 A1    May 14, 2020

Related U.S. Application Data

(63) Continuation-in-part of application No. 16/248,578, filed on Jan. 15, 2019, now abandoned.
(Continued)

(51) Int. Cl.
*G06Q 10/06* (2012.01)
*G06Q 30/00* (2012.01)
(Continued)

(52) U.S. Cl.
CPC ........ *G06Q 10/063112* (2013.01); *G06Q 10/063116* (2013.01); *G06Q 30/016* (2013.01); *H04L 51/04* (2013.01)

(58) Field of Classification Search
CPC ... G06Q 10/063112; G06Q 10/063116; G06Q 30/016; H04L 51/04
See application file for complete search history.

(56) References Cited

U.S. PATENT DOCUMENTS

| 6,609,122 B1 | 8/2003 | Ensor |
| 7,028,301 B2 | 4/2006 | Ding |

(Continued)

FOREIGN PATENT DOCUMENTS

EP    3531360 A1 *  8/2019  ......... G06F 3/04842

OTHER PUBLICATIONS

, Kittur, "The Future of Crowd Work" Feb. 23, 2013, Crowding out the Competition, Proceedings of the 2013 conference on Computer supported cooperative work.*

*Primary Examiner* — Jerry O'Connor
*Assistant Examiner* — Philip N Warner
(74) *Attorney, Agent, or Firm* — Fletcher Yoder PC

(57) ABSTRACT

A computational instance may contain queues configured to hold work items. The work items may be representations of user submissions requesting actions from a plurality of agents. The computational instance may also contain computing devices configured to: (a) obtain a set of assignment rules that specify mappings between (i) respective selection criteria for the assignment rules, and (ii) one or more candidate agents from the plurality of agents that can be assigned to address the work items with content that match the respective selection criteria, (b) read, from the queues, a work item corresponding to a user submission, (c) iterate through the assignment rules according to an ordering until a particular assignment rule with associated selection criteria that matches content of the work item is found, and (d) assign the work item to a particular agent from the one or more candidate agents.

20 Claims, 14 Drawing Sheets

Related U.S. Application Data

(60) Provisional application No. 62/926,291, filed on Oct. 25, 2019, provisional application No. 62/767,319, filed on Nov. 14, 2018.

(51) Int. Cl.
  *H04L 51/04* (2022.01)
  *G06Q 10/0631* (2023.01)
  *G06Q 30/016* (2023.01)

(56) References Cited

U.S. PATENT DOCUMENTS

| | | | |
|---|---|---|---|
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,895,132 B2 * | 2/2011 | Holsen | G06Q 10/08 340/904 |
| 7,930,396 B2 | 4/2011 | Trinon | |
| 2,945,860 A1 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,792,387 B2 | 10/2017 | George | |
| 10,084,665 B1 * | 9/2018 | Arunachalam | H04L 43/08 |
| 10,445,670 B2 * | 10/2019 | Chan | G06Q 10/063112 |
| 10,572,879 B1 * | 2/2020 | Hunter | G06Q 30/016 |
| 2011/0282795 A1 * | 11/2011 | Kadosh | G06Q 50/188 705/7.42 |
| 2013/0103973 A1 * | 4/2013 | Werth | H04L 41/0816 714/2 |
| 2014/0146961 A1 * | 5/2014 | Ristock | H04M 3/5234 379/265.11 |
| 2014/0297268 A1 * | 10/2014 | Govrin | G06N 5/02 704/9 |
| 2015/0381533 A1 * | 12/2015 | Klemm | H04L 51/02 709/206 |
| 2016/0036983 A1 * | 2/2016 | Korolev | H04M 3/5233 379/265.12 |
| 2018/0213087 A1 * | 7/2018 | Steiner | H04M 3/5232 |
| 2019/0058744 A1 * | 2/2019 | O'Connor | H04L 67/54 |
| 2019/0166254 A1 * | 5/2019 | Chishti | G06Q 10/06315 |
| 2020/0112535 A1 * | 4/2020 | George | G06Q 30/016 |

* cited by examiner

WORKFLOWS WITH RULE-BASED ASSIGNMENTS

CROSS-REFERENCE TO RELATED APPLICATIONS

The present application is a continuation-in-part application claiming priority to U.S. Non-Provisional patent application Ser. No. 16/248,578, filed Jan. 15, 2019, the contents of which are entirely incorporated by reference herein. U.S. Non-Provisional patent application Ser. No. 16/248,578 claims priority to U.S. Provisional Patent Application No. 62/767,319, filed on Nov. 14, 2018, the contents of which are entirely incorporated by reference herein. The present application further claims priority to U.S. Provisional Patent Application No. 62/926,291, filed on Oct. 25, 2019, the contents of which are entirely incorporated by reference herein.

BACKGROUND

A request management system, also referred to as a ticketing system or a help desk, enables agents to keep track of user submissions, such as requests and other customer-care-related issues. The request management system receives a submission from a user (e.g., a customer, an employee) and generates a work item to represent the submission. The request management system then assigns the work item to a queue. The queue serves as temporary storage until an agent is available to address the work item.

SUMMARY

An enterprise may use a request management system to organize and address submissions received from users, such as employees, customers, and other enterprises. Each submission received at the request management system may represent a request for assistance, review, or another form of communication with or by an agent. When the request management system receives a submission, the request management system may generate a work item to represent this submission. The work item may include information associated with the submission and can differ in type, for example, based on the medium that the user employed to provide the submission. For instance, a user submission in the form of a requested virtual chat may be represented by a first work item type and a user submission in the form of a telephone call may be represented by a second work item type. As such, the request management system may use channels to differentiate between the different work item types and may use multiple queues for each channel to further organize work items within each work item type. For example, the request management system may use multiple queues to organize work items according to different aspects of an enterprise, such as a billing queue, a products queue, a callback request queue, and a software assistance queue. In some cases, an enterprise may use a request management system that is provided and supported by a remote network management platform serving the enterprise.

Some enterprises may experience a large volume of work items. For example, an enterprise may receive dozens or even hundreds of user submissions during a short period of time (e.g., an hour). Although a request management system may help organize the incoming work items until agents are available, the large volume of work items can overload agents. Since each agent may have a limited capacity to address work items, a number of work items may experience long delays within queues waiting review by an agent. To reduce potential delays, these work items may be switched between different queues and assigned to agents managing queues with fewer work items. Switching work items between queues can result in work items being further delayed (e.g., a work item may be untracked when switched between queues). Further, assigning a work item to the next available agent without factoring the skills of the agent can cause problems when an agent lacks the skills to properly address an assigned work item. In such a case, the agent lacking the skills may reject the work item resulting in the work item returning to a queue, further delaying its resolution.

The embodiments presented herein describe examples for advanced routing and assignment of work items. An example request management system may use advanced queue distribution and intelligent agent assignment to reduce the amount of time each work item remains in a queue. The request management system may use data storage and analysis when identifying and assigning work items to agents to ensure that each work item is assigned to an agent with the particular skill set and availability to quickly and effectively address the work item. The request management system may also enable agents to reject and return assigned work items back to a queue and use the rejections to further refine parameters used for subsequent distribution of work items.

Further, the embodiments presented herein may use "rules-based assignments" to enable users to specify their own criteria for assigning work items to agents, thereby allowing agent assignments to be tailored to each enterprise's requirements. In addition, these "rules-based assignments" may be configured to continuously receive feedback to further refine and improve the effectiveness of the request management system.

Accordingly, a first example embodiment may involve a computational instance disposed within a remote network management platform and associated with a managed network. The computational instance may include memory containing one or more queues configured to hold work items. The work items may originate in relation to the managed network and may be representations of user submissions requesting actions from a plurality of agents. The computational instance may also include one or more computing devices configured to obtain a set of assignment rules that specify mappings between: (i) respective selection criteria for the assignment rules, and (ii) one or more candidate agents from the plurality of agents that can be assigned to address the work items with content that match the respective selection criteria, where the assignment rules have an ordering in which they are evaluated. The one or more computing devices may also be configured to read, from the one or more queues, a work item corresponding to a user submission. The one or more computing devices may also be configured to iterate through the assignment rules according to the ordering until a particular assignment rule with associated selection criteria that matches content of the work item is found. The one or more computing devices may also be configured to assign the work item to a particular agent from the one or more candidate agents.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
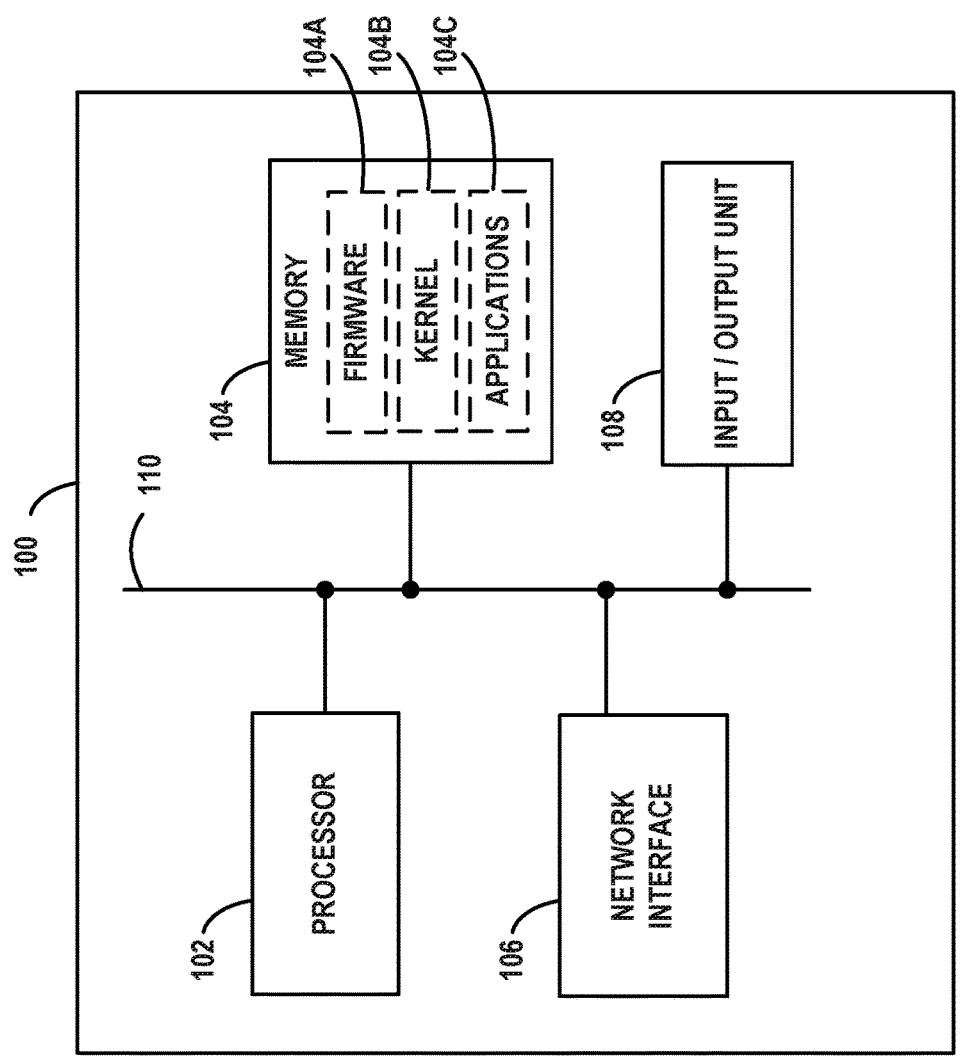
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
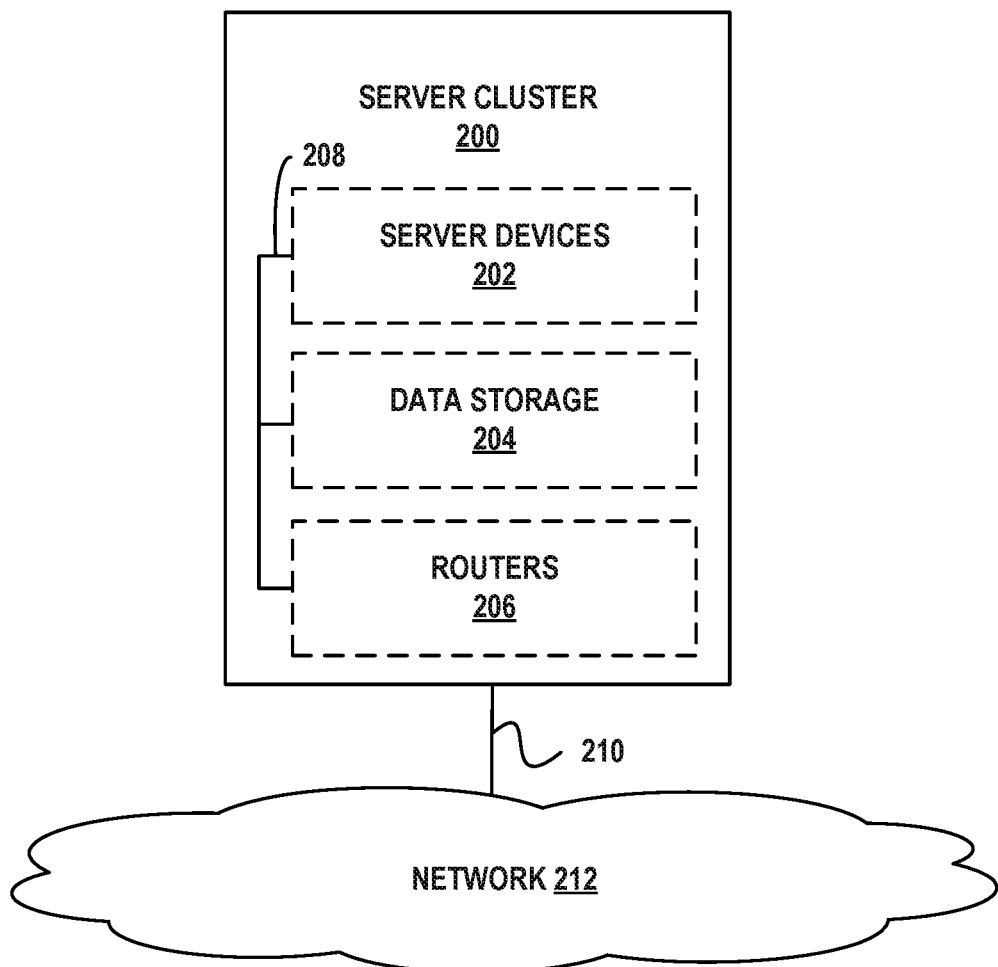
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
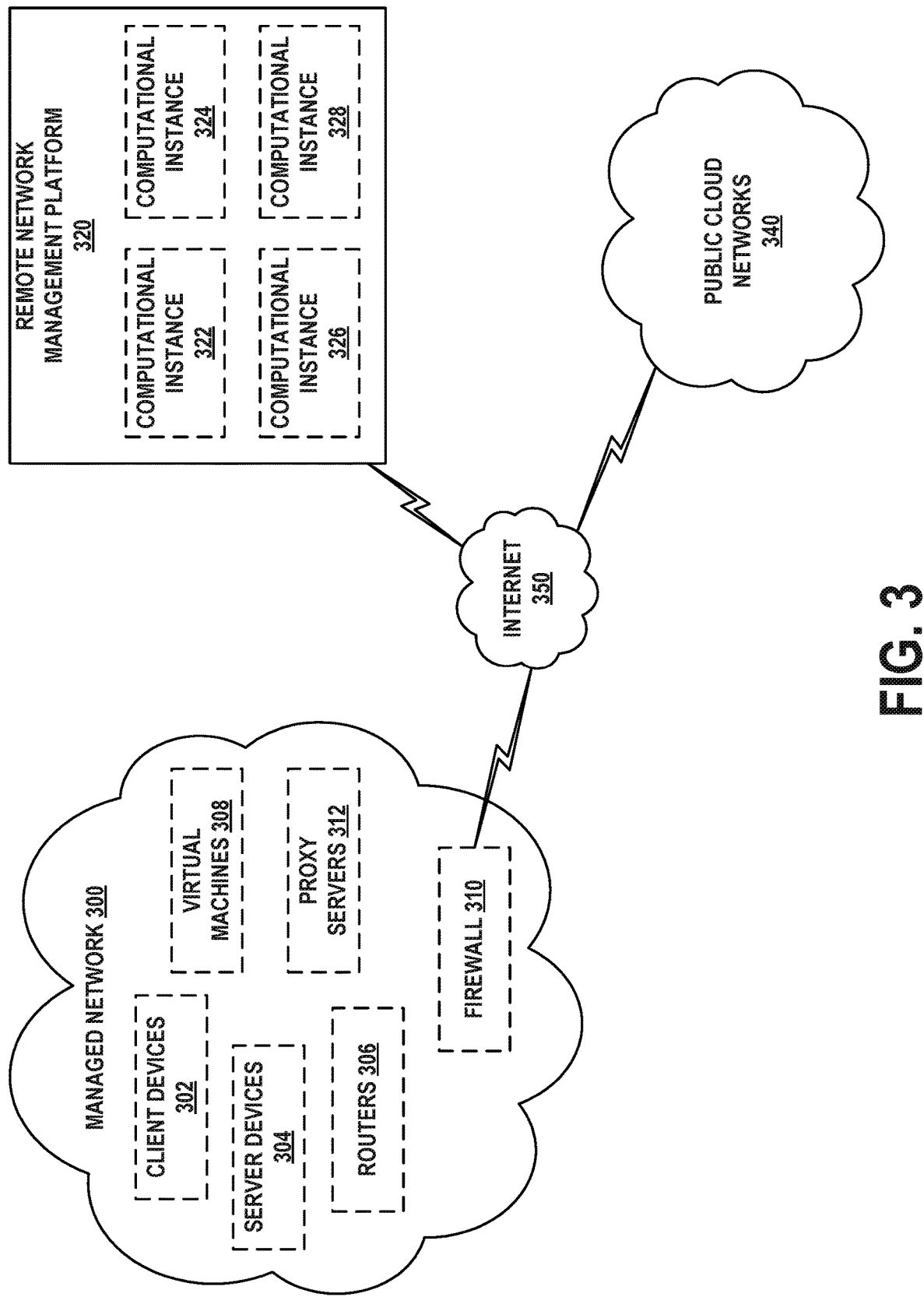
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
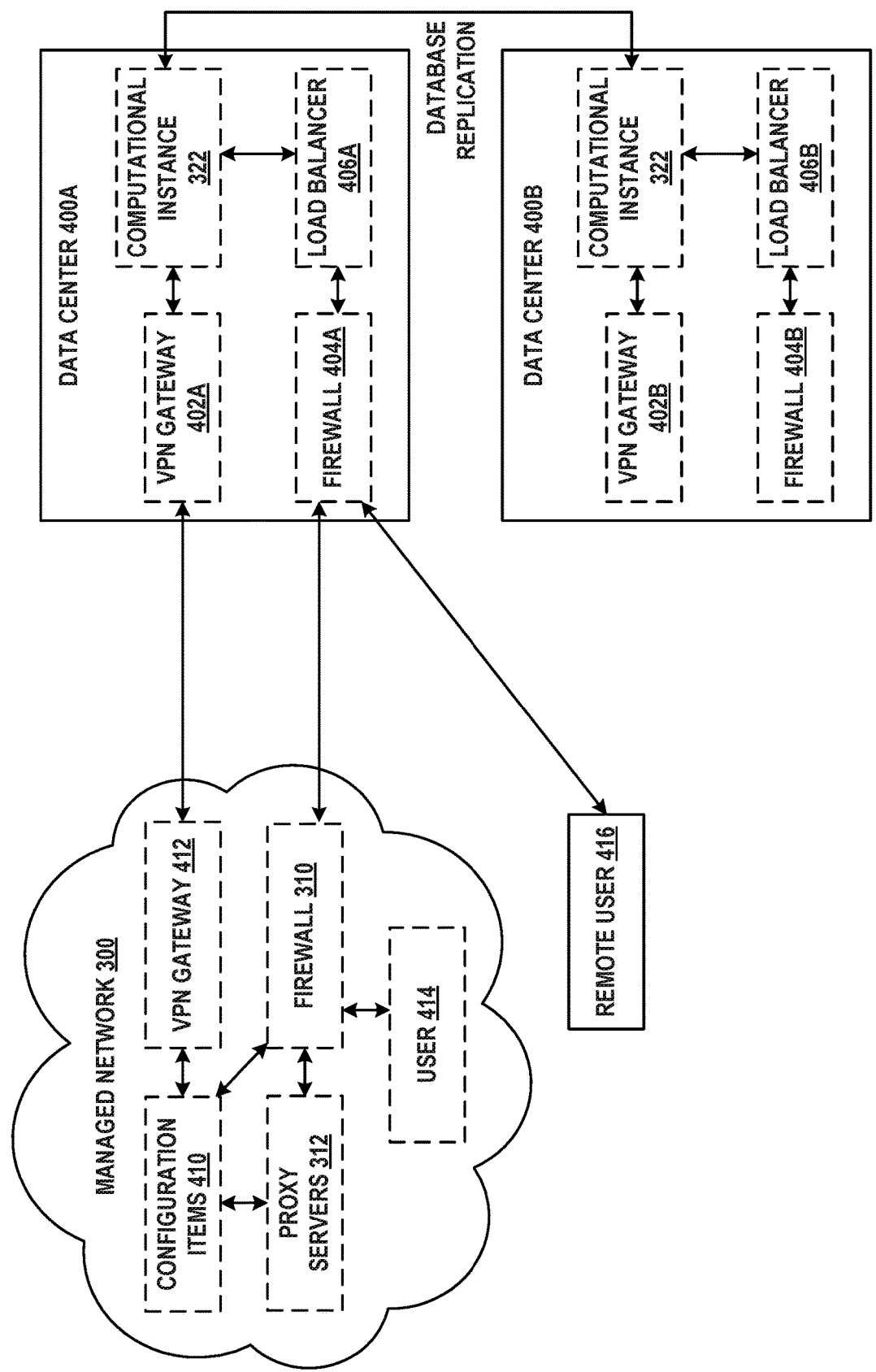
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
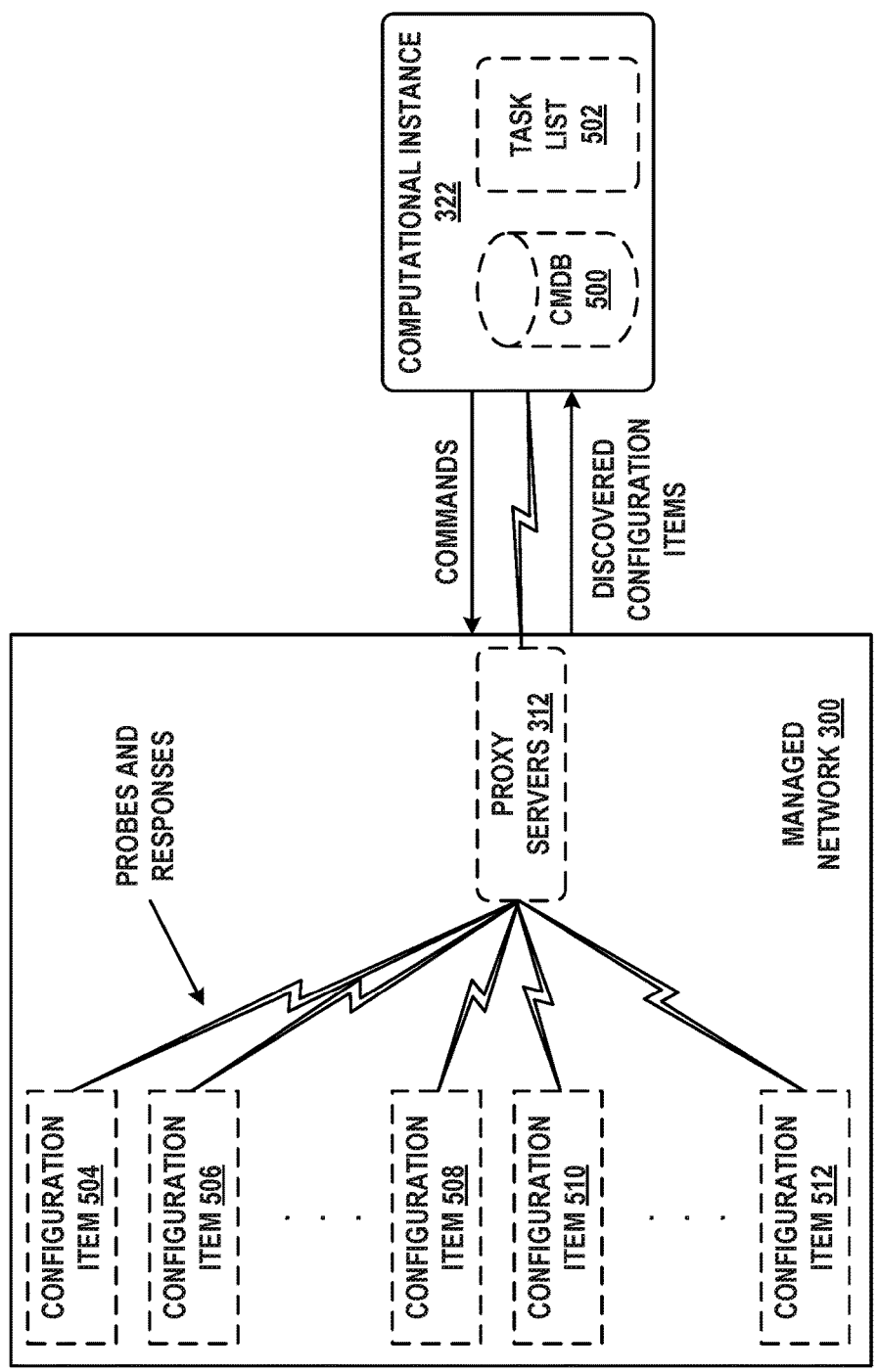
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
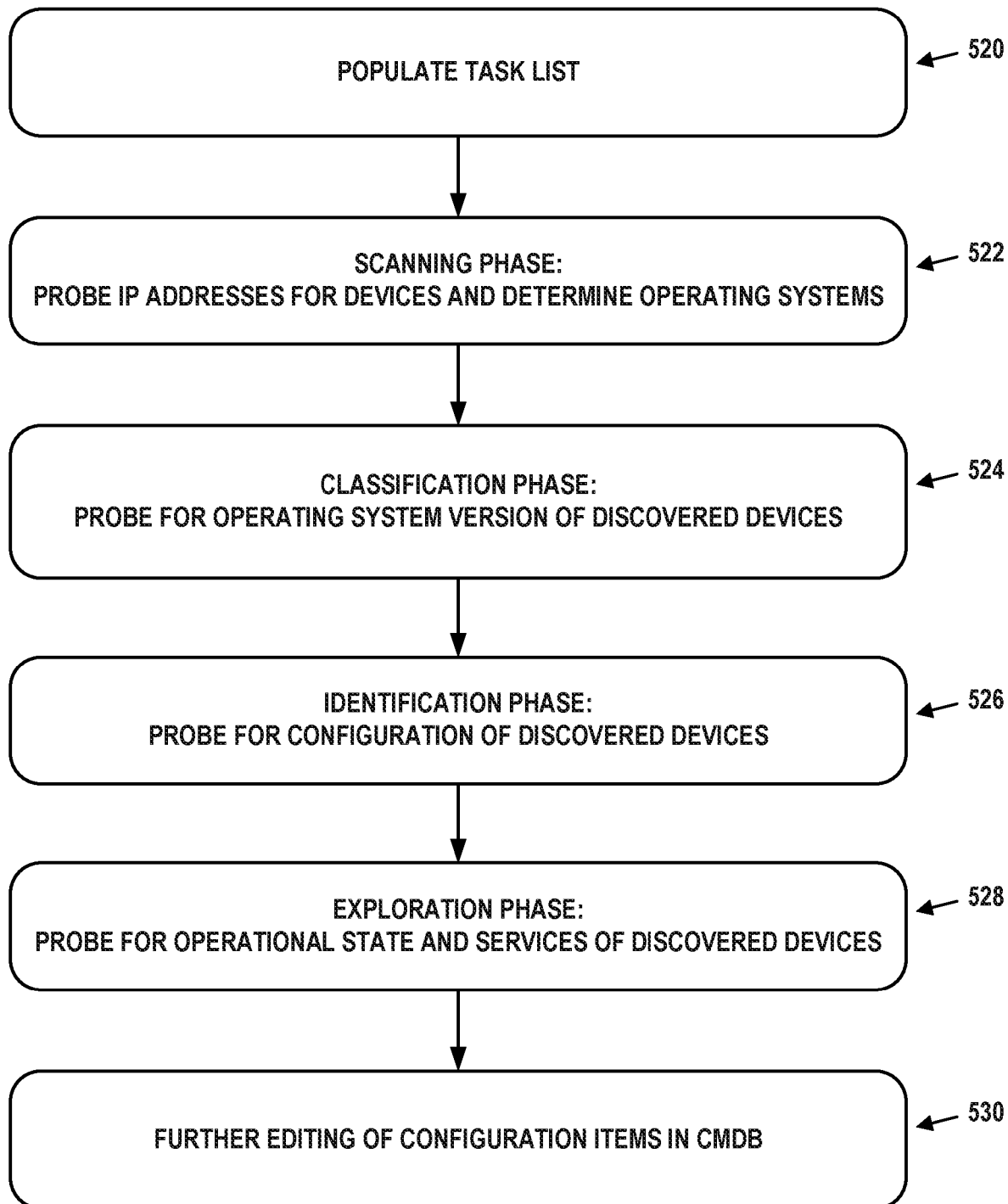
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Advanced Routing and Assignment of Work Items

An enterprise may experience a large volume of work items during operation. It is possible for a request management system used by an enterprise to receive numerous submissions from users within a short time period. Particularly, a large enterprise may receive dozens, hundreds, or even more submissions within a small window of time (e.g., an hour).

To manage the large volume, the enterprise's request management system may create work items for each submission and organize the work items into different queues. Although organizing the incoming work items into queues can help ensure that work items are addressed by agents, the large volume of work items can overload agents. Since each agent has a limited capacity when addressing work items, a rapid influx of work items may result in some work items remaining in queues for significant delays until addressed.

A technique used to reduce the amount of time work items remain within queues involves assigning work items immediately to the next available agent. This technique, however, may result in some work items being assigned to agents that lack the skills needed to resolve the work items. Another technique used to reduce work item delays involves rebalancing queues (i.e., transferring work items from longer queues to shorter queues). However, switching work items between queues can result in work items being further delayed (e.g., a work item may be untracked when switched between queues).

Example embodiments presented herein provide advanced routing and assignment of work items. An example request management system may efficiently organize and distribute work items to available agents with the appropriate skills. The example request management system may perform an analysis that factors agents' skills, current capacity, and queue priorities when distributing work items to agents. In some embodiments, a request management system may monitor the rejections of work items by agents to further refine parameters used when subsequently distributing work items to agents.

Figure 6:
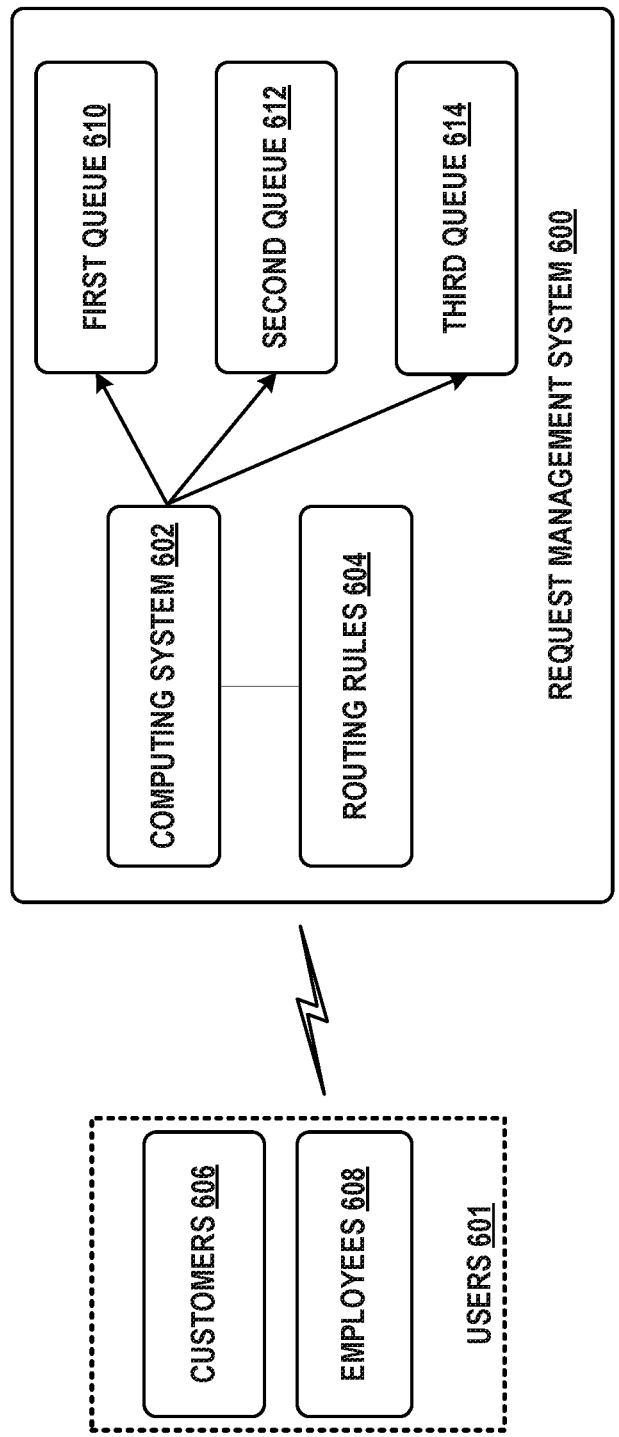
FIG. 6 depicts a request management system, in accordance with example embodiments.

To further illustrate, FIG. 6 depicts an example request management system arrangement configured for advanced routing and assignment of work items. Request management system 600 includes computing system 602, routing rules 604, first queue 610, second queue 612, and third queue 614. In other examples, request management system 600 may include more or fewer components.

Request management system 600 represents an example configuration of a request management system that may receive and organize user submissions for an enterprise. As shown in FIG. 6, request management system 600 may receive requests from users 601, such as customers 606 and employees 608. Users 601 can represent people or sources (e.g., another enterprise) that may provide submissions to request management system 600. Customers 606 may correspond to people outside an enterprise that may pay for services or products from the enterprise. Employees 608 may represent people that work for the enterprise. In further examples, users 601 may include submissions from another enterprise.

For each submission received at request management system 600, computing system 602 may generate a work item that represents the submission. Each work item may include information about the underlying request represented by the work item. For instance, a work item representing a user request may specify information that can assist the agent address and resolve the work item. The information may include the user's name, position within the enterprise (if any), geographic location, and an indication of the request (e.g., a summary). In some examples, a work item may include minimal information about the represented request or issue, but rather primarily serve as a placeholder in a queue until addressed by an agent. The type of information included within a generated work item may be configurable by an administrator overseeing request management system 600.

Computing system 602 may further assign generated work items into a queue (e.g., first queue 610, second queue 612, or third queue 614). In some examples, the operations performed by computing system 602 may be divided among multiple computing systems. For instance, a queue engine may be configured to receive submissions and assign corresponding work items into queues and an assignment engine may be configured to facilitate distribution of work items to capable and available agents.

As indicated above, work items may remain in queues until agents are available. A queue is a structure that can organize the work items generated by the request management system to represent different requests and issues submitted for agent review. One possible implementation of a queue is a database table or a file, both being persistent storage. Alternatively, non-persistent storage, such as main memory, could be used.

Different types of queues can be used within examples. Some examples may involve using one or more structured queues. A structured queue arranges assigned work items in a fixed, predictable position. For instance, a first-in first-out (FIFO) queue is a type of structured queue that involves organizing work items according to the order that requests or issues are received. By using a FIFO queue, work items may be addressed in a predictable, sequential order.

Some examples may involve using one or more unstructured queues that do not arrange incoming work items in a predictable manner. For example, request management system 600 may use a ranking system when generating work items to associate a level of priority with each work item. As a result, agents may selectively address some work items that have remained within the queue for a shorter duration than other work items. Other types of queues may be used by an example request management system.

When assigning work items into a queue, request management system 600 may use routing rules 604 to determine into which queue to assign each work item. Application of routing rules 604 may organize work items based on various criteria. For instance, each queue may represent a different aspect of the enterprise, such as business groups, geographic locations, products, or other aspect of the enterprise. In some examples, routing rules 604 may factor the customer or employee status of the person submitting the request or issue. For example, the request management system may identify issues or requests originating from accounts with a Very Important Person (VIP) status and assign work items representing those submissions into a VIP queue. Routing rules 604 may factor other criteria that help organize the work items in a manner that can reduce the duration that each work item spends assigned to a queue.

Computing system 602 or another system (e.g., assignment engine 722 shown in FIG. 7) may facilitate agent assignment to queues and distribution of work items among the agents. An agent may be a representative of the enterprise capable of addressing work items. As such, an agent may be a human agent or a virtual agent.

A human agent may be an employee of the enterprise that can review and address work items. For example, the IT group within the enterprise may serve as human agents that address requests and issues submitted by employees. As another example, an enterprise may include a customer representative group consisting of agents that address submissions from customers.

Virtual agents may also be used to address and resolve work items assigned to queues by request management system 600. A virtual agent may be a program based on artificial intelligence (AI) that can provide automated customer service, including the ability to address and resolve various types of work items. In particular, the AI may involve using machine learning and/or natural language processing, among other possible techniques. Each virtual agent may use AI and cognitive computing processes to communicate with the user submitting the request or issue. For instance, a virtual agent may engage in email, virtual chat, or voice communication. The virtual agent may be able to understand customer intent (e.g., input from the user of the computing device) and can provide personalized answers to questions in a humanlike manner.

In some examples, a virtual agent may initially address a work item and subsequently connect the customer or employee who submitted the represented issue or request with a human agent. For example, a virtual agent may obtain information regarding an issue represented by a work item, then provide the work item along with the obtained information to an available human agent. In other examples, a virtual agent may also address and resolve work items without human agent intervention. In particular, the virtual agent might only submit the work item to a human agent when the virtual agent is unable to resolve the request associated with the work item. For example, the remote management system or the virtual agent itself may determine that the difficulty in resolving a work item exceeds a highest threshold difficulty level that the virtual agent is capable of handling. As a result, a human agent may be reassigned to the work item.

An agent may address a work item using various communication formats, the selection of which may depend on the type of communication used to submit the represented request or issue. For example, an agent may address a work item representing a telephone call by engaging in real-time voice communication with the employee or customer. In some cases, an agent may address and resolve a work item sometime after the work item was created by request management system 600. For instance, the agent may resolve a work item without participating in real-time communication with the user who submitted the request or issue when the work item does not require direct communication. As an example, a work item with a request for approval (e.g., an email for a new software application) may enable an agent to review the request and approve without additional communication.

In some examples, a request management system used by an enterprise is provided and supported by a remote network management platform. For instance, remote network management network 320 may provide and support request management system 600 used by managed network 300. Request management system 600 may receive requests and issues that originate from computing devices in managed network 300 (e.g., client devices 302). Request management system 600 may further assign work items representing the received requests and issues into multiple queues for agents within managed network 300 to address.

Some example implementations may involve remote network management platform 320 interacting with managed network 300 by way of computational instance 322. In particular, computational instance 322 may be disposed within remote network management platform 320 and may include multiple queues for organizing work items for agent review. As such, a computing device within computational instance 322 may perform functions of a request management system, such as receiving and managing requests and issues from users associated with managed network 300. The computing device may also generate work items to represent the received requests and issues and assign the work items into the multiple queues for agents within managed network 300 to address. In some examples, multiple computing devices could perform these functions. In further examples, agents associated with remote network management platform 320 may assist with addressing and resolving work items.

Figure 7:
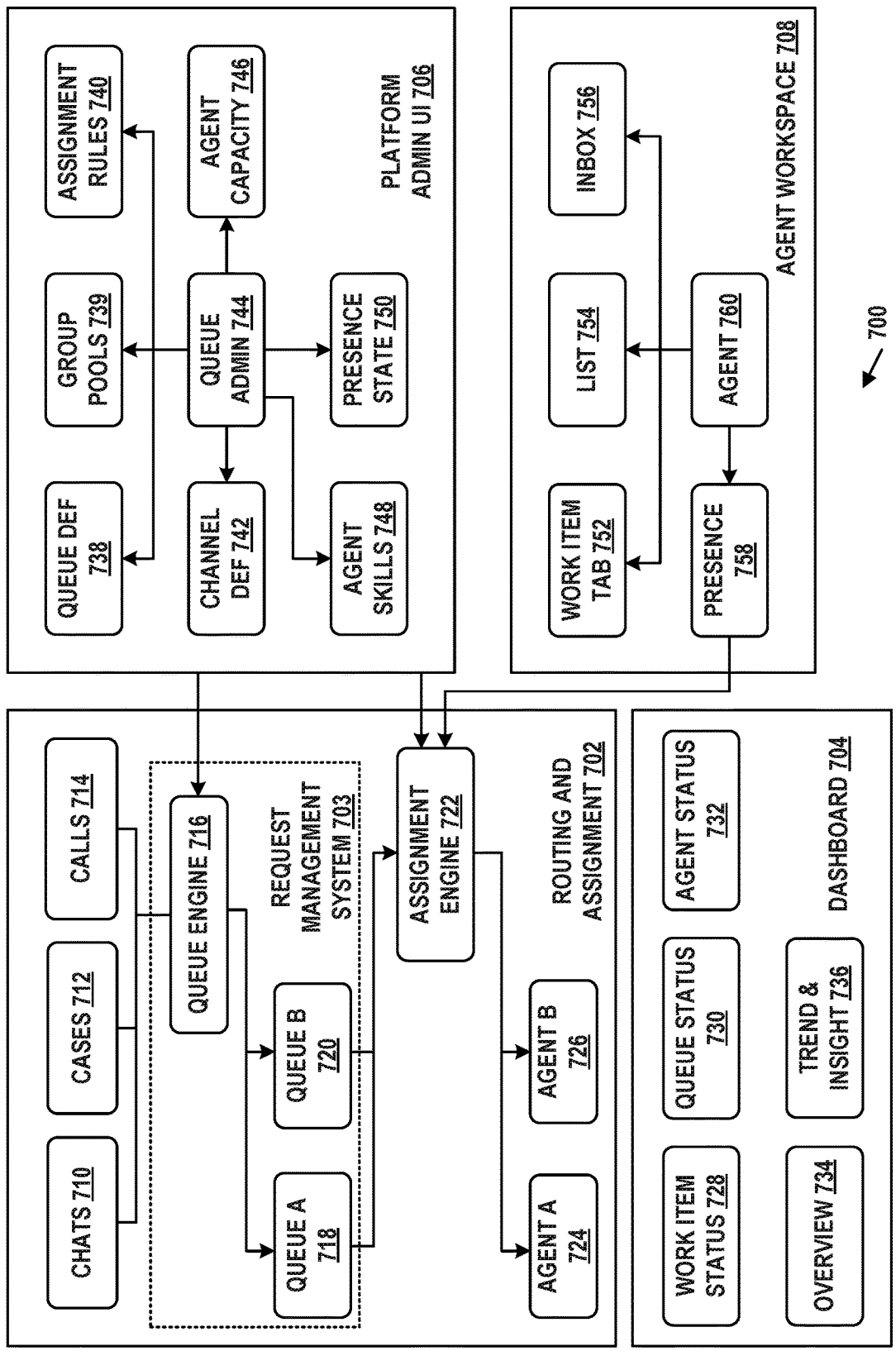
FIG. 7 depicts a component diagram for advanced routing and assignment of work items, in accordance with example embodiments.

FIG. 7 depicts a component diagram for advanced routing and assignment of work items, in accordance with example embodiments. Component diagram 700 includes various components arranged into four different groups: (i) routing and assignment components 702, (ii) dashboard components 704, (iii) platform administration user interface (UI) 706, and (iv) agent workspace components 708. Each group is shown for illustration purposes and component diagram 700 may include components arranged into more or fewer groups in other examples.

Component diagram 700 represents various components of a system to facilitate advanced routing and assignment of work items. The example system may manage a large volume of submissions received at an enterprise such that work items representing the submissions are assigned to and resolved by agents. Particularly, the system may analyze different factors when selecting agents for work items, such as the skill set, queue priority, and capacity level of each agent. The queue priorities may indicate queue orders that the available agents follow when addressing work items from multiple queues.

In some examples, the system may use data storage to store parameters that help differentiate the agents available to address work items. Particularly, the system may review the parameters when selecting an agent that meets the needs of a work item. The system may also revise the parameters based on inputs from the agents. For instance, when an agent rejects multiple work items of a given type, the system may revise parameters related to the agent such that the system avoids assigning work items that are the given type to the agent.

Routing and assignment components 702 include request management system 703 and other components used to receive user submissions, generate and distribute representative work items into queues, and facilitate work item assignment to agents. In some examples, routing and assignment components 702 may also enable the direct assignment of a newly generated work item to an agent without the use of a queue.

Within routing and assignment components 702, user submissions are represented by chats 710, cases 712, and calls 714. Chats 710 represent virtual chat communications submitted to request management system 703 by users via messenger interfaces (e.g., via an instant messenger or online chat application). A user may use a messenger application to participate in real-time virtual text communication with an agent. As an example, a customer may request information regarding a product using virtual chat on the enterprise's website.

Cases 712 represent predefined forms that users can fill out and submit for review by an agent (e.g., an online questionnaire or form provided via a web interface). In some instances, the creation of a case may take place during communication (e.g., phone call, virtual chat) between an agent and user. The agent may compile information into a case form based on information provided by the user. An email is another example type of a case 712.

Calls 714 represent a user requesting agent attention via real-time voice communication. In some cases, calls 714 may include telephone calls placed by a user seeking to directly communication with a representative of the enterprise. For example, request management system 703 may connect a customer's telephone call with a customer representative within the enterprise.

The type of communication format used to submit a request can impact the amount of information about the request that is included within the associated work item. For example, a work item representing a request placed in a telephone call format may include less information than a work item representing a request received in an email format. In some cases, an agent may address a work item using the same communication format that the request or issue was submitted.

For each submission received by request management system 703, queue engine 716 may generate a work item to represent the submission and assign that work item into a queue. Particularly, queue engine 716 or another component within request management system 703 may perform routing process 800 shown in FIG. 8 to determine when to generate a work item to represent a received user submission.

In some examples, request management system 703 may include channels to arrange user submissions initially before work items are generated. For instance, a first channel may contain work items of a first type (e.g., chats 710) and a second channel may contain work items of a second type (e.g., cases 712). Queue engine 716 may use the channels to select user submissions and distribute work items representing the user submissions into queues. Channels may contain both user submissions and generated work items.

Queue A 718 and queue B 720 are shown in FIG. 7 to represent example queues, but more or fewer queues may be used within examples. For instance, work items may be distributed into a number of queues based on aspects of the enterprise.

Routing and assignment components 702 further include assignment engine 722, which may facilitate the distribution of work items to available agents, such as agent A 724 and agent B 726. In particular, assignment engine 722 may use information and parameters provided by platform administration UI 706 and/or one or more databases when identifying agents for work items. As such, an administrator may define rules that impact the distribution of work items to available agents.

Assignment engine 722 may be configured to use matching rules and assignment rules to identify work items that meet certain conditions and then route those work items to agents. Matching rules may be based on defined sets of conditions. For instance, a first set of conditions may identify specific work item attributes and a second set of conditions may identify the agent resources suited to handle work items with the specific work item attributes. An administrator may be able to modify matching rules using a rule form or another interface associated with platform administration UI 706. In some examples, assignment engine 722 or another computing system may identify work item attributes by referring to a table that lists attributes that a work item must meet before being routed via a channel. Each channel may contain and facilitate the distribution of a particular type of work item (and user submissions of the particular type). In some examples, assignment engine 722 may be a component within request management system 703.

Dashboard 704 includes data visualizations that may assist users or agents understand information about a work item, such as the status of the work item. As shown in FIG. 7, dashboard 704 may include visuals that represent work item status 728, queue status 730, agent status 732, overview 734, and trend & insight 736. Each visual may represent information related to a selected work item or a group of work items in the form of a graphical user interface.

For example, a dashboard may represent the average waiting time of work items in a particular queue, the distribution of waiting times of work items in the particular queue, the average work item processing time of a particular agent, the distribution of work item processing times of the particular agent, and so on.

In some examples, dashboard 704 may be a responsive layout that enables users to share widgets, such as reports and performance analytics visualizations. For instance, dashboard 704 may be modified using a drag and drop canvas that enables creating, editing, and arranging content. As such, users or agents may share customized dashboard arrangements. In other examples, dashboard 704 may be non-responsive with limitations preventing some users from creating, viewing, and editing visuals. For instance, a non-responsive dashboard may use layouts with predefined drop zones.

Platform administration UI 706 represents a graphical user interface that an administrator may use to modify operations of request management system 703 and assignment engine 722. As shown in FIG. 7, platform administration UI 706 includes various interface options, such as queue definition 738, group pools 739, assignment rules 740, channel definition 742, queue administration 744, agent capacity 746, agent skills 748, and presence state 750.

Queue definition 738 may enable an administrator to review and define parameters for each queue. For instance, queue definition 738 may specify location, type of work item, issue restrictions, and other parameters that direct when work items may be assigned into a given queue. Group pools 739 may enable an administrator to modify groups of agents assigned to different queues within request management system 703.

Assignment rules 740 may enable an administrator to review and define parameters for assignment engine 722. In some cases, a computing system may update assignment rules 740 based on feedback provided by users or agents. For instance, the computing system may modify assignment rules 740 after receiving an indication that an agent or multiple agents rejected a work item.

Channel definition 742 may enable an administrator to define the operations of the channels. Particularly, channel definition 742 may allow an administrator to define or change the type of work item each channel contains. Queue administration 744 may represent a sign-in interface that enables an administrator to sign in and access the different options offered via platform administration UI 706.

Agent capacity 746 may enable an administrator to review and modify the capacity level of each agent. In some instances, agents may be limited to accept a certain quantity of work items at a given time. As such, agent capacity 746 for each agent may be adjusted by an administrator. Agent capacity 746 may enable an administrator to review the amount of time (e.g., average, standard deviation, or distribution of time) that an agent has used to address work items. Agent skills 748 may enable an administrator to review and modify the skills of each agent. Presence state 750 may enable the administrator to review which agents are available and which agents are offline.

Agent workspace 708 represents an graphical user interface that an agent may use to obtain, address, and resolve work items. As shown in FIG. 7, agent workspace 708 includes work item tab 752, list 754, inbox 756, presence 758, and agent 760. An agent may use agent workspace 708 to interact with work items, including accepting work item assignments from assignment engine 722. Agent workspace 708 may enable an agent to accept a work item, request additional information, propose a solution, update the work item, close the work item, and delete the work item, among other options.

Work item tab 752 may enable the agent to select and work on different work items. For instance, agent workspace 708 may use list 754 to show different work items awaiting review based on the position of the work item within a queue. Similarly, inbox 756 may serve as temporary storage for work items assigned to the agent by assignment engine 722.

Agent 760 may represent a sign-in interface that enables an agent to sign in and access the different options offered via agent workspace 708. Particularly, agent 760 may enable request management system 703 to identify when a particular agent is available via presence 758. Presence 758 may provide an indication to assignment engine 722 when the particular agent using agent workspace 708 is available to obtain work items.

Figure 8:
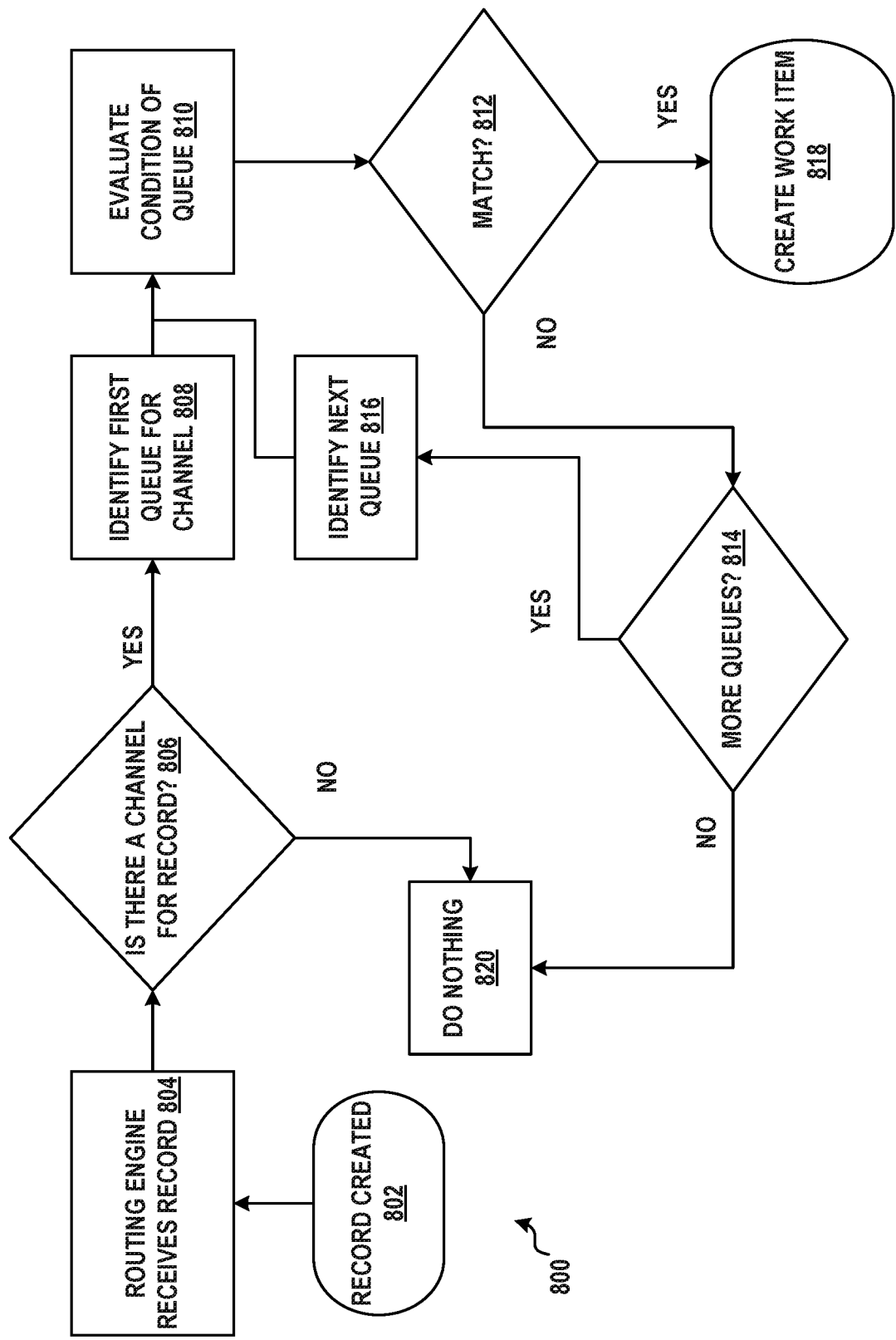
FIG. 8 depicts a routing flow diagram, in accordance with example embodiments.

FIG. 8 illustrates a routing flow diagram, in accordance with example embodiments. Routing flow 800 represents a process that queue engine 716 shown in FIG. 7 or another computing system may perform to organize user submissions. For example, request management systems 600, 700 may perform one or more steps of routing flow 800 in response to receiving a user submission, such as a chat, email, call, or case, etc.

Step 802 involves creating a record based on the submission received from a user. For example, request management system 703 or another computing system may receive user submissions and initially create a record for each submission. A record may represent a user submission ready for further analysis.

Step 804 involves routing engine receiving the created record. A request management system may include a computing system configured to serve as a routing engine that receives created records. For example, queue engine 716 within request management system 703 may receive records as each record is created.

Step 806 involves determining whether there is a channel for that type of record. Channels may contain a particular type of record (and work items that are the same type). For example, a channel may contain both records of a particular type that have not yet been generated into work items along with the work items that represent the records of that type.

Channels may serve as filters for created records. Particularly, an administrator may define the parameters of the channels. For example, an administrator may require that a record contains a certain amount of information to qualify for a channel.

If there is a channel for that type of record, then routing flow 800 proceeds to step 808. Step 808 involves identifying a first queue for the channel. A channel may be associated with one or more queues. Each queue may organize work items based on particular factors, such as location of the user, type of work item, type of request, and product category, etc. As such, after identifying a first queue of the channel, routing flow 800 proceeds to step 810 that involves evaluating the condition of the first queue. Evaluating the condition may involve determining one or more parameters about the queue, such as how many work items are currently assigned to the queue, the average wait time work items assigned to the queue wait until addressed by an agent, rules for work items to qualify for the queue, and/or the number of agents addressing the queue, etc.

If there is not a channel for the record, routing flow 800 proceeds to step 820 that involves doing nothing (i.e., not creating a work item for the record). If a created record fails to find a channel, the record may not result in a generated work item. In some examples, step 820 may involve performing another process, such as a review of the created record by an administrator. The failure of the record to qualify for a channel may also result in the record being sent back to the user with a request for additional information or a change in medium used to submit the record. Alternatively, a default channel for requests that do not qualify for any other channel may be used.

After performing step 810 to evaluate condition of the first queue, step 812 involves determining if features of the record match the parameters of the first queue. If the record qualifies, a work item is generated to represent the record as shown in step 818. If a match is not determined, routing flow 800 proceeds to step 814. Step 814 involves identifying whether there is one or more queues available in the channel identified at step 806. If there are more queues available, routing flow 800 proceeds to identifying the next queue at step 816. From step 816, routing flow 800 proceeds to evaluating the condition of the new queue at step 810, and checking if the record is a match for the new queue at step 812. From step 812, routing flow 800 may involve either creating a work item based on determining a match between the record and the new queue at step 818 or checking if there is yet another queue available in the channel at step 814.

Figure 9:
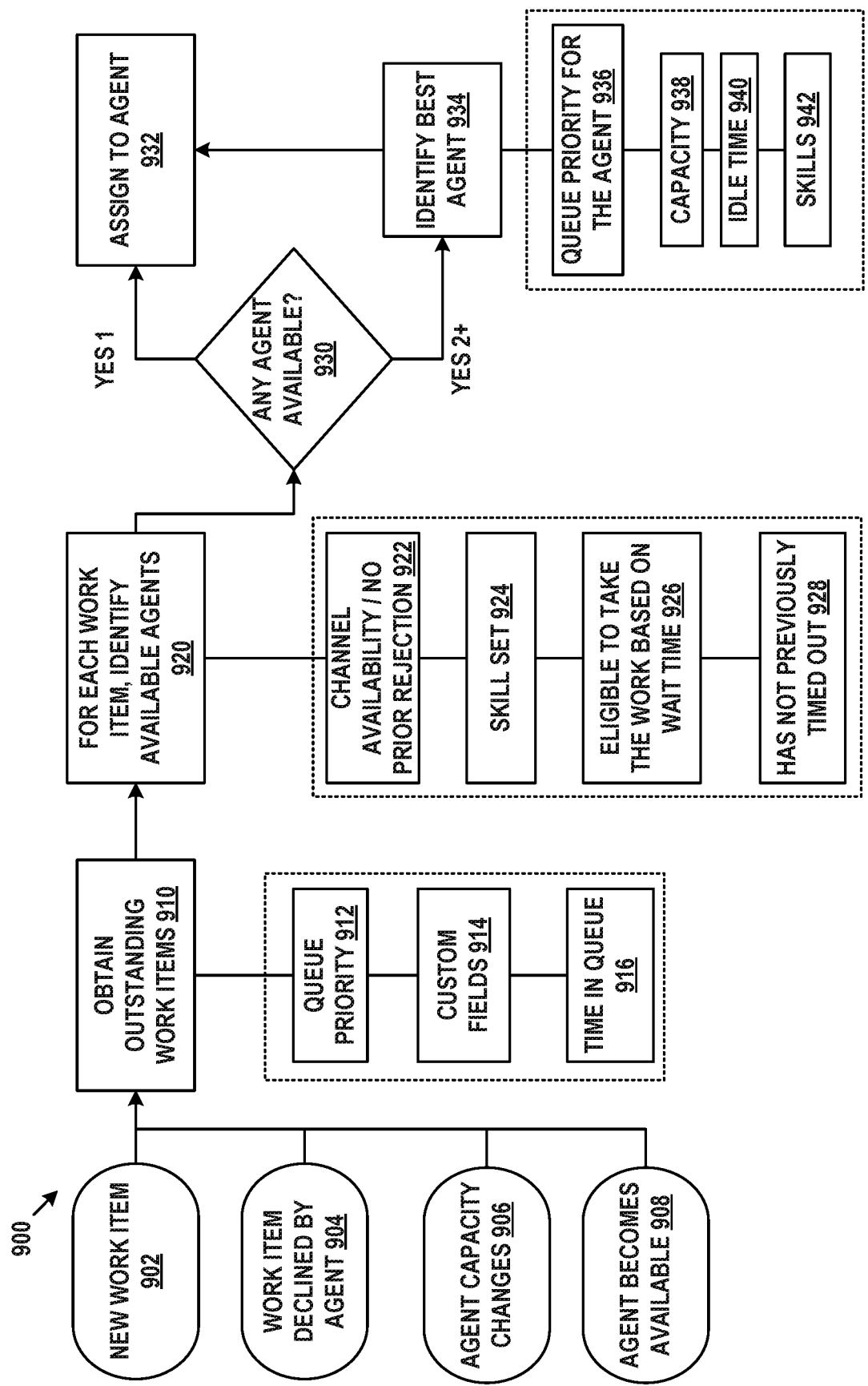
FIG. 9 depicts an assignment flow diagram, in accordance with example embodiments.

FIG. 9 illustrates an assignment flow diagram, in accordance with example embodiments. Assignment engine 722 or another computing system may perform assignment flow 900 to facilitate the assignment of work items to agents that are available and capable. As shown, various initial steps may trigger the start of assignment flow 900. For instance, step 902 involves the creation of a new work item. When a new work item is generated as a result of routing flow 800 or another process, assignment engine 722 may receive an indication of the generation of the work item. For example, assignment engine 722 may receive an indication of a newly created work item from queue engine 716 or another component within request management system 703.

Assignment flow 900 may also initiate in response to a work item being declined by an agent as shown in step 904. An agent may be assigned a work item, but may choose to reject the work item for various reasons, such as an inability to resolve the work item, a poor match of the agent's skills with the needs of the work item, or the agent taking a break from addressing work items. An agent may also reject a work item based on the capacity level of the agent (i.e., the number of work items assigned to the agent).

Step 906 involves an indication that the capacity of an agent changed. For instance, a capacity change may indicate an increase or a decrease in the number of cases that an agent is assigned. For example, an agent may take a break resulting in a number of cases potentially being released from the agent. Similar to a capacity change of an agent, step 908 represents another initial step and involves receiving an indication that an agent has become available.

In response to the occurrence of one or more of the operations in step 902-908, assignment flow 900 proceeds to step 910. Step 910 involves obtaining one or more outstanding work items. The manner that assignment engine 722 receives work items can vary depending on the types of work items and the initial step that triggered the start of assignment flow 900. When obtaining one or more outstanding work items, assignment engine 722 may select the work items based on various factors, such as queue priority of each work item (step 912), custom fields (step 914), and the amount of time each work item spent in the queue (step 916).

Step 920 involves identifying available agents for each work item. Identifying available agents may involve analyzing one or more databases of agent information. For instance, identifying available agents may involve checking agents that are capable of addressing the type of work item (i.e., assigned to that channel) as shown in step 922. Step 922 may also involve identifying and removing any agent that has already rejected the work item from consideration of handling the work item. Step 924 involves identifying available agents based on the skill sets of the various agents. Work items may require different skills to resolve. Skills can include languages, work item types, specific knowledge about a subject or situation, and request within submissions, among others. Further, some agents may specialize in certain aspects of the enterprise and might therefore focus their efforts only on those aspects.

Step 926 involves identifying agents that are available based on work item wait time. The current capacity level of an agent may indicate that the agent will be busy for a long duration. As a result, assignment engine 722 may identify the agent as unavailable. Step 928 involves checking whether the work item has previously timed out for an agent. Assignment engine 722 may remove agents that failed to resolve the work item from consideration.

Step 930 involves determining whether any agent is available. Assignment engine 722 may review presence 758 from an agent to determine whether the agent could accept the work item. If only one agent is identified as available and capable of addressing the work item, assignment flow 900 proceeds to assign the work item to the agent at step 932. In particular, assignment engine 722 may transmit an indication to the agent regarding the assignment of the work item.

If more than one agent is available, assignment 900 proceeds to step 934, which involves identifying the "best" agent to address the work item (here, the "best" agent is not necessarily the optimal agent, but an agent chosen according to the embodiments herein). Particularly, assignment engine 722 may select an agent among the available agents. Finding the "best" available agent may involve analyzing one or more factors, such as the queue priority for each available agent (step 936), the capacity of each agent (step 938), the idle time of each agent (940), and/or the skill set of each agent (step 942). The queue priority may indicate the order that agents address queues when assigned to manage multiple queues. The capacity level of an agent may indicate the number of work items already assigned to the agent. The idle time of each agent may indicate the amount of time since the agent last addressed a work item. The skill set of each agent may indicate the different skills that agents have to offer for resolving work items. Assignment engine 722 may review one or more databases that indicate the skills of agents. In some embodiments, a cost function implemented as a weighted sum of these factors may be used to identify an agent.

After identifying the "best" agent at step 934, assignment flow 900 proceeds to assign the work item to the identified agent at step 932. Assignment engine 722 may provide an indication to the agent regarding the assignment. If no agents are available, the work item may remain in the queue. In some examples, assignment engine 722 may receive an indication of a rejection of an assigned work item by an agent. As a result, assignment engine 722 may identify a second agent using assignment flow 900 for assignment of the work item.

VI. Example Rule-Based Assignment of Work Items

The inability to assign an appropriate agent to address a work item may have negative consequences for a request management system. For example, if an unsuitable agent is assigned to a work item, the agent may take a lengthy amount of time to address the work item because the agent may not have the proper background to quickly address the work item. This may result in the agent addressing fewer work items over the course of a day. And if many agents are inappropriately assigned and take excessive amounts of time to address work items, the request management system may experience prolonged queue delays, customer dissatisfaction, and other undesirable outcomes.

Yet, because enterprises often have disparate requirements that demand tailored assignment mechanisms, assigning a work item to an agent that can quickly address the work item can be a complex task. For example, one enterprise may prefer to assign agents to work items based on the users that submitted the work items, whereas another enterprise may prefer to assign agents to work items based on the enterprise from which the work items were submitted. Consequently, a standard assignment mechanism that merely takes into account the availability or capacity of agents can be insufficient for addressing the idiosyncrasies of various enterprises.

The embodiments described herein can address these and other issues. In particular, the systems herein may allow enterprises to specify their own criteria for assigning work items to agents, thus enabling the enterprises to tailor their assignment mechanisms to suit their needs. Also known as "rules-based assignments", the assignment mechanisms described herein may be configured to analyze the context of a work item to distribute work item to an available agent with the background to address the work item, advantageously reducing the amount of time work items remain within queues. Additionally, the "rules-based assignments" described herein may be configured to continuously receive feedback to further refine the rules used to assign work items to agents, thereby incrementally improving the throughput of a request management system. Other advantages are also possible and will be recognized from the description herein.

The request management systems and assignment engines described herein may be provided and supported by a remote network management platform. For example, remote network management network 320 may provide and support a request management system and an assignment engine, perhaps by way of computational instance 322. In some cases, the request management systems described herein receive requests that originate from computing devices in managed network 300 (e.g., client devices 302).

However, in some examples, managed network 300 may provide services to one or more end-user networks. In turn, these end-user networks may request assistance from agents within managed network 300. In these scenarios, the request management systems and assignment engines receive requests that originate from computing devices in the end-user networks and may correspondingly assign work items representing the received requests and issues into multiple queues for agents within managed network 300 to address.

Figure 10:
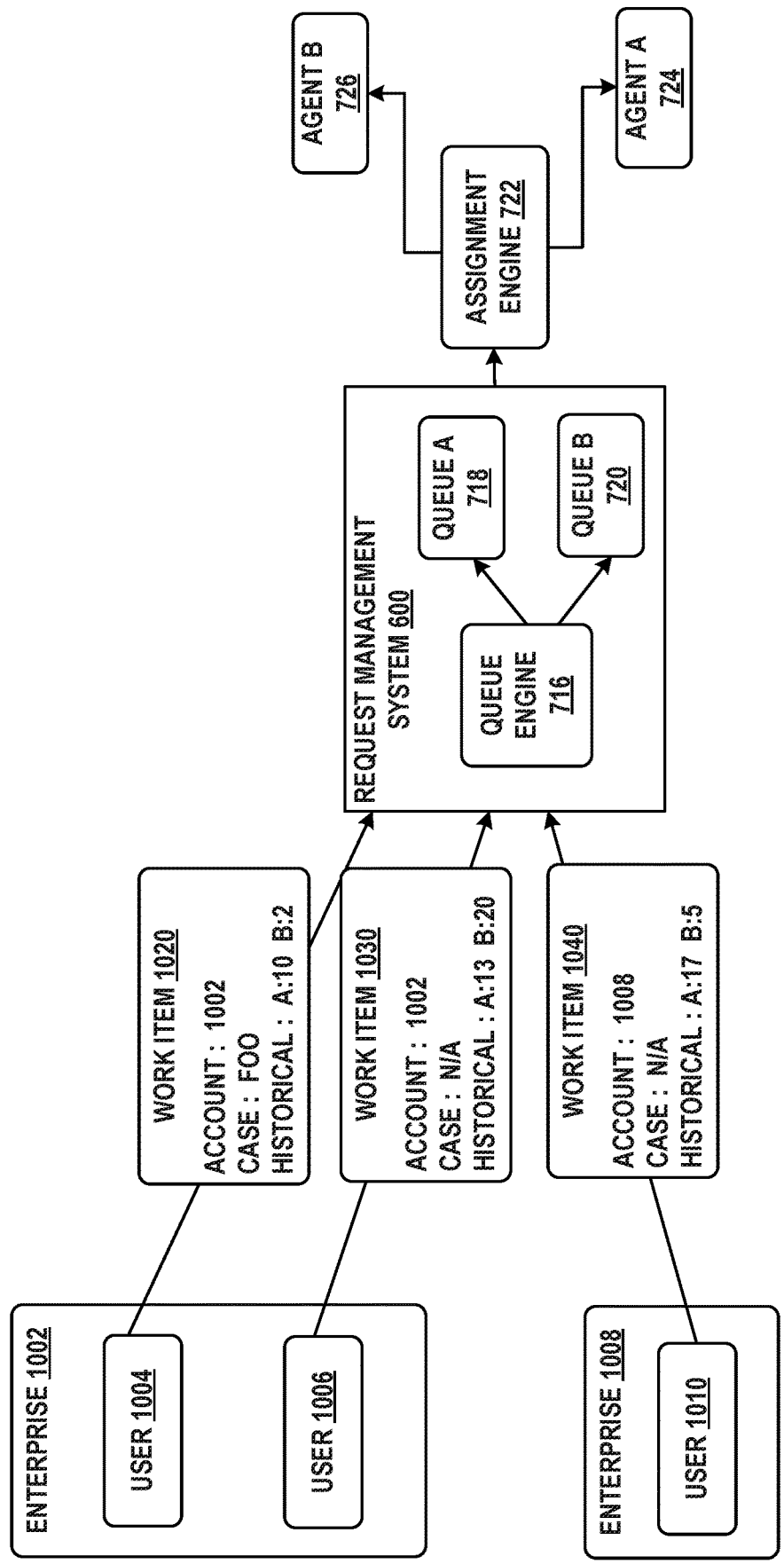
FIG. 10 depicts an example arrangement for rule-based assignments of work items, in accordance with example embodiments.

FIG. 10 depicts an example arrangement for rule-based assignments of work items, in accordance with example embodiments. In particular, FIG. 10 includes request management system 600, enterprise 1002 (which includes users 1004 and 1006), enterprise 1008 (which includes user 1010), assignment engine 722, agent A 724, and agent B 726. In other examples, the arrangement of FIG. 10 may include more or fewer components.

Notably, the arrangement of FIG. 10 is such that requests originate from computing devices in end-user networks. But portions of the following description may equally apply in the scenario in which requests originate from computing devices in managed network 300

Enterprise 1002 may represent an end-user network that uses the services of request management system 600. As shown in FIG. 10, enterprise 1002 contains user 1004 and user 1006, both of whom may be customers/employees of enterprise 1002. Likewise, enterprise 1008 may represent another end-user network that uses the services of request management system 600. As shown in FIG. 10, enterprise 1008 contains user 1010, who may be customer/employee of enterprise 1008.

As described above, request management system 600 represents an example request management system that receives submissions from users 1004, 1006, and 1010 and responsively generates work items that represent the submissions. For example, a submission by user 1004 is represented by work item 1020, a submission by user 1006 is represented by work item 1030, and a submission by user 1010 is represented by work item 1040.

In line with the discussion above, each work item generated by request management system 600 may include information about the underlying request or issue represented by the work item. For instance, a work item may specify information that can assist an agent in addressing the work item. The information may include the user's name, position within the enterprise (if any), geographic location, and an indication of the request (e.g., a summary).

In addition, each work item generated by request management system 600 may include content related to one or more "assignment rules". As refer to herein, an "assignment rule" assists assignment engine 722 with assigning a work item to an appropriate agent. In particular, a given assignment rule may specify a mapping between (i) a selection criteria for the assignment rule, and (ii) one or more candidate agents that can be assigned to address the work items with content that match the selection criteria. Assignment engine 722 may have several assignment rules, each with a different selection criteria.

Account-based assignment rules assign work items to agents that are allocated to the end-user network that generated the work items. The selection criteria for account-based assignment rules may evaluate a given work item's content to ascertain the end-user network that generated the given work item. As an example, since users 1004 and 1006 belong to enterprise 1002, work items 1020 and 1030 include content that associates them with enterprise 1002 (e.g., the "account" field is shown to be "1002"). Likewise, since user 1010 belongs to enterprise 1008, work item 1040 includes content that associates it with enterprise 1008 (e.g., the "account" field is shown to be "1008").

After determining the particular end-user network that generated a given work item, account-based assignment rules may assign the given work item to agents that are associated with the particular end-user network. For example, an administrator may configure assignment engine 722 (e.g., via platform administration UI 706) so that agent A 724 is associated with to enterprise 1002 and agent B 726 is associated with to enterprise 1008. Accordingly, assignment engine 722 may assign work items generated by enterprise 1002 (e.g., work items 1020 and 1030) to agent A 724 and may assign work items generated by enterprise 1008 (e.g., work item 1040) to agent B 726.

In some embodiments, an agent can be associated with multiple end-user networks. For example, an administrator may configure assignment engine 722 so that agent A 724 is associated with enterprise 1002 and enterprise 1008. Accordingly, assignment engine 722 may assign work items generated by enterprise 1002 (e.g., work items 1020 and 1030) to agent A 724 and may also assign work items generated by enterprise 1008 (e.g., work item 1040) to agent A 724.

In some embodiments, assignment engine 722 may use different levels of account-based assignment rules to assign work items. For example, an administrator may configure assignment engine 722 so that agent A 724 becomes primary agent associated with enterprise 1002 and agent B 726 becomes the secondary agent associated with enterprise 1002. Within this configuration, assignment engine 722 may first attempt assign work items generated by enterprise 1002 to agent A 724. However, if agent A 724 is unavailable, assignment engine 722 may then attempt to assign work items generated by enterprise 1002 to agent B 726.

In some embodiments, assignment engine 722 may use account-based assignment rules only if request managed system 600 is configured to receive requests that originate from computing devices in end-user networks Case-based assignment rules assign work items to agents that are allocated to the particular cases associated with the work items. The selection criteria for case-based assignment rules may evaluate a given work item's content to ascertain the case associated with the given work item. Cases were mentioned above in the context of FIG. 7. But to reiterate, a case is a series of records or forms that an agent uses to organize and resolve a particular request from a user. For example, a case may track all actions that an agent takes to resolve a user's request, including phone calls or emails made the agent, knowledge base research performed by the agent, and dispatch requests made by the agent to field service representatives, as well as other actions.

In some embodiments, the series of records or forms related to a case may be accessed by a user via a web interface provided by request management system 600. In such embodiments, the user may use the web interface to edit the records or forms and submit the case for review by a specific agent. In some instances, the specific agent to which a case is submitted to becomes a case manager for that case. In other instances, a case may have no case manager.

A given work item may be associated with a particular case if a user submits a request to request management system 600 while in the context of the particular case. Generally speaking, being within the context of the particular case refers to the user maintaining a connection with the web interface that hosts the series records or forms that define the particular case. As an example, if a user instantiates a virtual chat via the same web interface that contains the series of records or forms that define the particular case, then the virtual chat request may be associated with the particular case.

Not every work item may be associated with a particular case. For example, work items 1030 and 1040 are shown to have no associated cases (e.g., the "case" field is shown to be "N/A"). This may result from a scenario in which a user submits a request to request management system 600 while not in the context of any case. For example, a user may place a phone call request to request management system 600 while not being connected with the web interface that hosts the series records or forms that define the particular case.

If a work item is associated with a particular case and the particular case has a case manager, case-based assignment rules may assign the work item to the case manager for the particular case. For example, work item 1020 is shown to be associated with the case "Foo" (e.g., the "case" field is shown to be "Foo"). If agent A 724 is the case manager for the case "Foo", then assignment engine 722 would assign work item 1020 to agent A 724.

In some embodiments, an agent can be a case manager for multiple cases. For example, agent A 724 may be the case manager for the case "Foo" and may be the case manager for the case "Bar" (not shown). Accordingly, assignment engine 722 may assign work items associated with the case "Foo" to agent A 724 and may also assign work items associated with the case "Bar" to agent A 724.

If a work item is associated with a particular case but the particular case does not have a case manager, case-based assignment rules may use prediction models to identify agents that have be allocated to cases that have at least a threshold degree of similarity with the particular case associated with the work item at issue. In examples, the prediction models may be trained using a supervised or unsupervised machine learning approach. For supervised models, the prediction models could be trained with labeled data that includes attributes of cases previously allocated to agents. These attributes may include, but are not limited to, the priority of the case, the subject matter of the case, the account associated with the case, among other possibilities.

During an inference phase, the trained prediction models can be applied to the particular case associated with the work item at issue to predict one or more cases that have at least a threshold degree of similarity with the particular case associated with the work item at issue. For example, the prediction models may represent cases as N-dimensional vectors, where each attribute of a case is a dimension in N-space. Then, the prediction models may determine N-dimensional vectors that are similar to the N-dimensional vector for the particular case associated with the work item at issue. For example, the prediction models may compute cosine similarity scores between the N-dimensional vector for the particular case and N-dimensional vectors for other cases and may choose 0.9 or 0.8 as the threshold degree of similarity (e.g., any cosine similarity score between the N-dimensional vector for the particular case and the N-dimensional for another case that is above 0.9 or 0.8). Then, assignment engine 722 could determine an agent that was most frequently assigned to the one or more cases that have at least a threshold degree of similarity and may responsively assign the work item to that agent. It will be understood that other procedures for determining similar cases are possible and contemplated within the scope of the present disclosure.

The prediction models/algorithms described above could be implemented using, for example, a logistic or linear regression, a support vector machine (SVM), a Bayes network, among other possibilities. A training phase could include evaluating how well the given model predicts an outcome given the labeled data as input. For example, the training phase could include determining a loss function based on a difference between the predicted outcome and the labeled outcome. Various optimization algorithms are possible, including maximum likelihood estimation (MLE) or other fitting algorithms.

Historical-based assignment rules assign work items to agents that are frequently assigned to the users that generated the work items. The selection criteria for historical-based assignment rules may evaluate a given work item's content to ascertain which agents have been frequently assigned to work items associated with the same user that generated the given work item. For example, work item 1020 indicates that assignment engine 722 assigned agent A 724 to work items associated with user 1004 ten times and assigned agent B 726 to work items associated with user 1004 two times. Similarly, work item 1030 indicates that assignment engine 722 assigned agent A 724 to work items associated with user 1006 thirteen times and assigned agent B 726 to work items associated with user 1006 twenty times. Further, work item 1040 indicates that assignment engine 722 assigned agent A 724 to work items associated with user 1010 seventeen times and assigned agent B 726 to work items associated with user 1010 five times.

After determining the frequency that agents have been assigned to work items associated with the particular user that generated a given work item, historical-based assignment rules may assign the given work item to the agent most frequently assigned to work items associated with the particular user. For example, since assignment engine 722 previously assigned ten work items associated with user 1002 to agent A 724 and previously assigned two work items associated with user 1002 to agent B 726, assignment engine 722 should assign work items associated with user 1002 to agent A 724 rather than to agent B 726.

In some embodiments, the selection criteria for historical-based assignment rules may evaluate a given work item's content for assignments made in the past N days (e.g., N=1 day, 7 days, 14 days, 30 days, 365 days, month, quarter, etc.). For example, if N=7 days and assignment engine 722 assigned twenty work items associated with user 1002 to agent A 724 eight days ago and assigned two work items associated with user 1002 to agent B 726 five days ago, then assignment engine 722 should assign work items associated with user 1002 to agent B 726 rather than to agent A 724, because agent B 726 was assigned more work items associated with user 1102 within the 7 day time frame.

In some embodiments, historical-based assignment rules assign work items to agents that are frequently assigned to work items associated with the account/channel/queue that generated the work items. In such embodiments, the selection criteria for historical-based assignment rules may evaluate a given work item's content to ascertain which agents have been frequently assigned to work items associated with the account/channel/queue that generated the given work item.

Notably, the assignment rules described above are presented for the purpose of discussion and are not intended to be limiting with respect to the embodiments herein. Other types of assignment rules may exist and may be contemplated in the disclosure herein.

During operations, assignment engine 722 may evaluate one or more assignment rules to appropriately assign a work item to a given agent. In some embodiments, an administrator from an enterprise (e.g., an administrator from managed network 300) may configure assignment engine 722 to evaluate the assignment rules in accordance with a pre-defined order. The pre-defined order may indicate which assignment rules assignment engine 722 should evaluate first, which assignment rules assignment engine 722 should evaluate second, and so on. Advantageously, this allows enterprises to specify a pre-defined order for evaluating assignment rules that suits their particular needs. For example, one enterprise may prefer to initially assign agents to work items based on the users that submitted the work items, whereas another enterprise may prefer to initially assign agents to work items based on the enterprise from which the work items were submitted.

In some embodiments, assignment rules may be evaluated on a per queue or per channel basis. That is, each queue or each channel may be configured with their own set of assignment rules and/or pre-defined order to evaluate the set of assignment rules. As an example, work items that are in queue A 718 may be evaluated with respect to a first set of assignment rules, whereas work items that are in queue B 720 may be evaluated with respect to a second set of assignment rules, where the first set of assignment rules is different that the second set of assignment rules. In other embodiments, assignment rules may be evaluated globally across all queues or channels.

Figure 11:
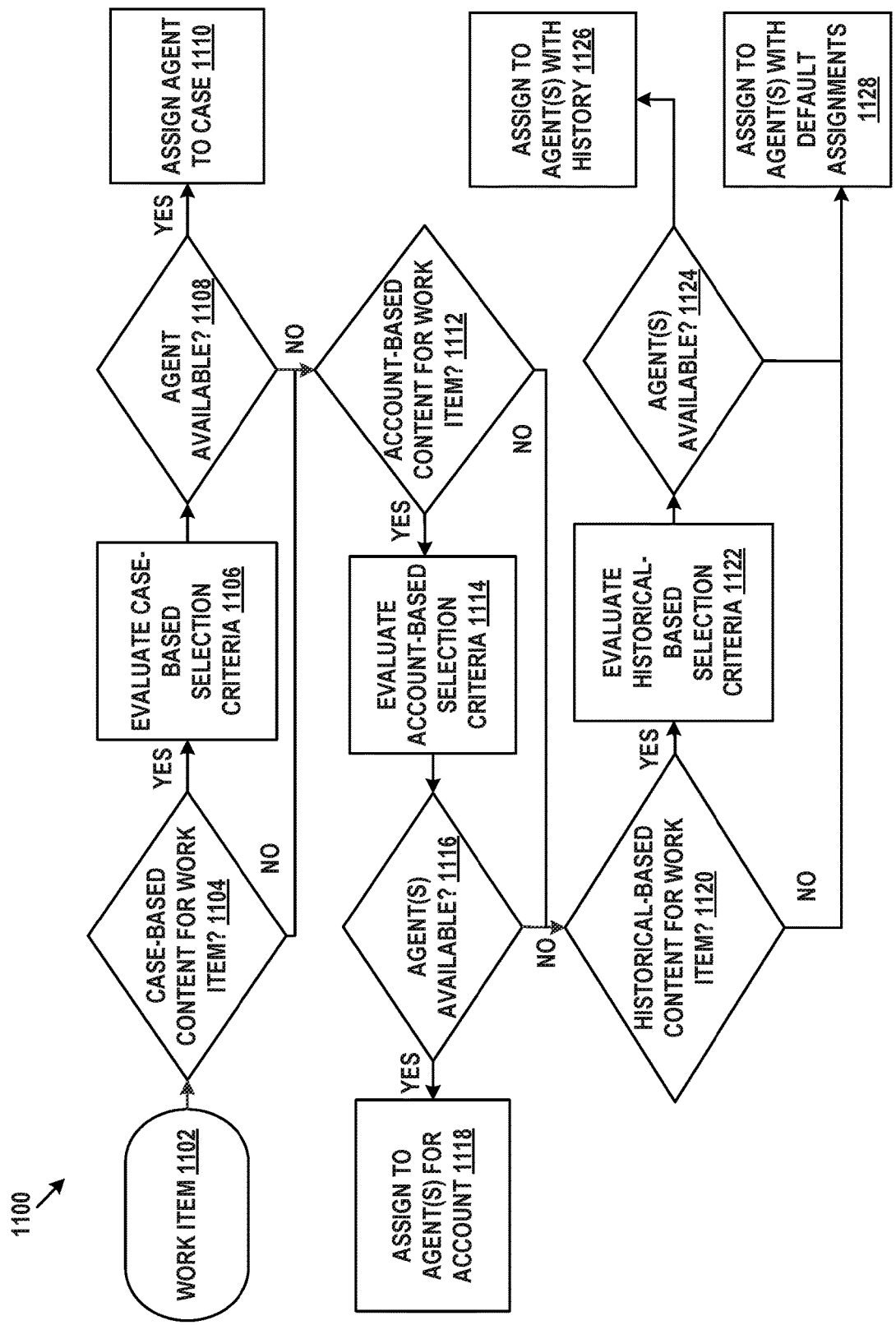
FIG. 11 is a flowchart depicting evaluation of assignment rules, in accordance with example embodiments.

FIG. 11 depicts flowchart 1100, in accordance with example embodiments. Flowchart 1100 illustrates an example pre-defined order used by assignment engine 722 to evaluate assignment rules with respect to work item 1102. In some embodiments, flowchart 1100 may take the form of steps 930, 932, and 934 of assignment flow 900. In other words, assignment engine 722 or another computing system performing assignment flow 900 may perform some or all of the procedures of steps 1104, 1106, 1108, 1110, 1112, 1114, 1116, 1118, 1120, 1122, 1124, 1126, and 1128 while performing some or all of the procedures of steps 930, 932, and 934 of assignment flow 900.

At step 1104, assignment engine 722 determines whether work item 1102 has any content associated with case-based assignment rules. This may involve, for example, querying a database, perhaps CMBD 500, to obtain case-based content for work item 1102. If work item 1102 has content associated case-based assignment rules, flowchart 1100 may continue to step 1106. Otherwise, if work item 1102 does not have content associated case-based assignment rules, flowchart 1100 may continue to step 1112.

At step 1106, assignment engine 722 evaluates the selection criteria for case-based assignment rules to determine one or more candidate agents that can be assigned to address work item 1102. This may involve (i) determining, based on the content of work item 1102, the particular case associated with work item 1102 and (ii) determining the agent allocated to the particular case. In line with the discussion above, if work item 1102 is associated with a case that has a case manager, then assignment engine 722 will proceed to assign work item 1102 to the case manager. Alternatively, if work item 1102 is associated with a case that does not have a case manager, assignment engine 722 may use the aforementioned prediction models to assign work item 1102 to an agent that was previously assigned cases similar to the case associated with work item 1102.

At step 1108, assignment engine 722 determines whether the agent identified in step 1106 is available. As explained with respect to FIG. 9, assignment engine 722 may be unable to assign work item 1102 to a given agent because that given agent may be already occupied in addressing another work item or otherwise unavailable. If the agent determined in step 1106 is available, then flowchart 1100 may proceed to step 1110 and may responsively assign work item 1102 to the available agent. Otherwise, if the agent determined in step 1106 is unavailable, flowchart 1100 may proceed to step 1112.

At step 1112, assignment engine 722 determines whether work item 1102 has any content associated with account-based assignment rules. This may involve, for example, querying a database, perhaps CMBD 500, to obtain account-based content for work item 1102. If work item 1102 has content associated account-based assignment rules, flowchart 1100 may continue to step 1114. Otherwise, if work item 1102 does not have content associated account-based assignment rules, flowchart 1100 may continue to step 1120.

At step 1114, assignment engine 722 evaluates the selection criteria for account-based assignment rules to determine one or more candidate agents that can be assigned to address work item 1102. This may involve (i) determining, based on the content of work item 1102, the particular account associated with work item 1102 and (ii) determining the agent allocated to the particular account. In line with the discussion above, if multiple levels of account-based assignment rules exist, then assignment engine 722 may determine the agent allocated to each of those levels for the particular account.

At step 1116, assignment engine 722 determines whether the agent determined in step 1114 is available. If the agent determined in step 1114 is available, then flowchart 1100 may proceed to step 1118 and may responsively assign work item 1102 to the available agent. In examples, if multiple levels of account-based routing rules exist, assignment engine 722 may, in order of the levels, determine whether the agent at each of those levels is available. If the agent (or agents) determined in step 1114 is unavailable, flowchart 1100 may proceed to step 1120.

At step 1120, assignment engine 722 determines whether work item 1102 has any content associated with historical-based assignment rules. This may involve, for example, querying a database, perhaps CMBD 500, to obtain historical-based content for work item 1102. If work item 1102 has content associated historical-based assignment rules, flowchart 1100 may continue to step 1122. Otherwise, if work item 1102 does not have content associated historical-based assignment rules, flowchart 1100 may continue to step 1128.

At step 1122, assignment engine 722 evaluates the selection criteria for historical-based assignment rules to determine one or more candidate agents that can be assigned to address work item 1102. This may involve (i) determining, based on the content of work item 1102, the frequency in which agents have been assigned to work items associated with the user that generated work item 1102 and (ii) determining the agent that has been most frequently assigned to work items associated with the user that generated work item 1102.

At step 1124, assignment engine 722 determines whether the agent determined in step 1122 is available. If the agent determined in step 1122 is available, then flowchart 1100 may proceed to step 1126 and may responsively assign work item 1102 to the available agent. Otherwise, if the agent determined in step 1122 is unavailable, flowchart 1100 may proceed to step 1128.

At step 1128, assignment engine 722 may use one or more default assignment mechanisms to assign work item 1102 to an appropriate agent. These default assignment mechanisms may include, for example, the assignment mechanisms described with respect to step 934 of method 900, which involve assignment engine 722 analyzing one or more factors, such as the queue priority for each available agent (step 936), the capacity of each agent (step 938), the idle time of each agent (940), and/or the skill set of each agent (step 942).

Notably, the pre-defined order of method 1100 is presented for the purpose of example and is not intended to be limiting with respect to the embodiments herein. In practice, a user could configure assignment engine 722 to evaluate assignment rules with respect to any pre-defined order. For example, the user may specify a pre-defined order in which historical-based assignment rules are evaluated first, followed by account-based assignment rules, then followed by case-based assignment rules. To specify a pre-defined order, remote network management platform 320 may prompt the user to enter the appropriate information for the pre-defined order. This may be accomplished by way of a web page or series of web pages, perhaps hosted by computational instance 322 and provided to the user from managed network 300 upon request.

In some cases, assignment engine 722 may be configured to update the assignment rules/pre-defined ordering of assignment rules based on feedback received from users, perhaps users 601. This enables assignment engine 722 to identify the assignment rules/pre-defined order of assignment rules that best reduce the amount of time work items remain within queues. To facilitate this update, assignment engine 722 may provide an interface to users 601, who may then responsively provide feedback on the current assignment rules/pre-defined ordering used by assignment engine 722.

Figure 12:
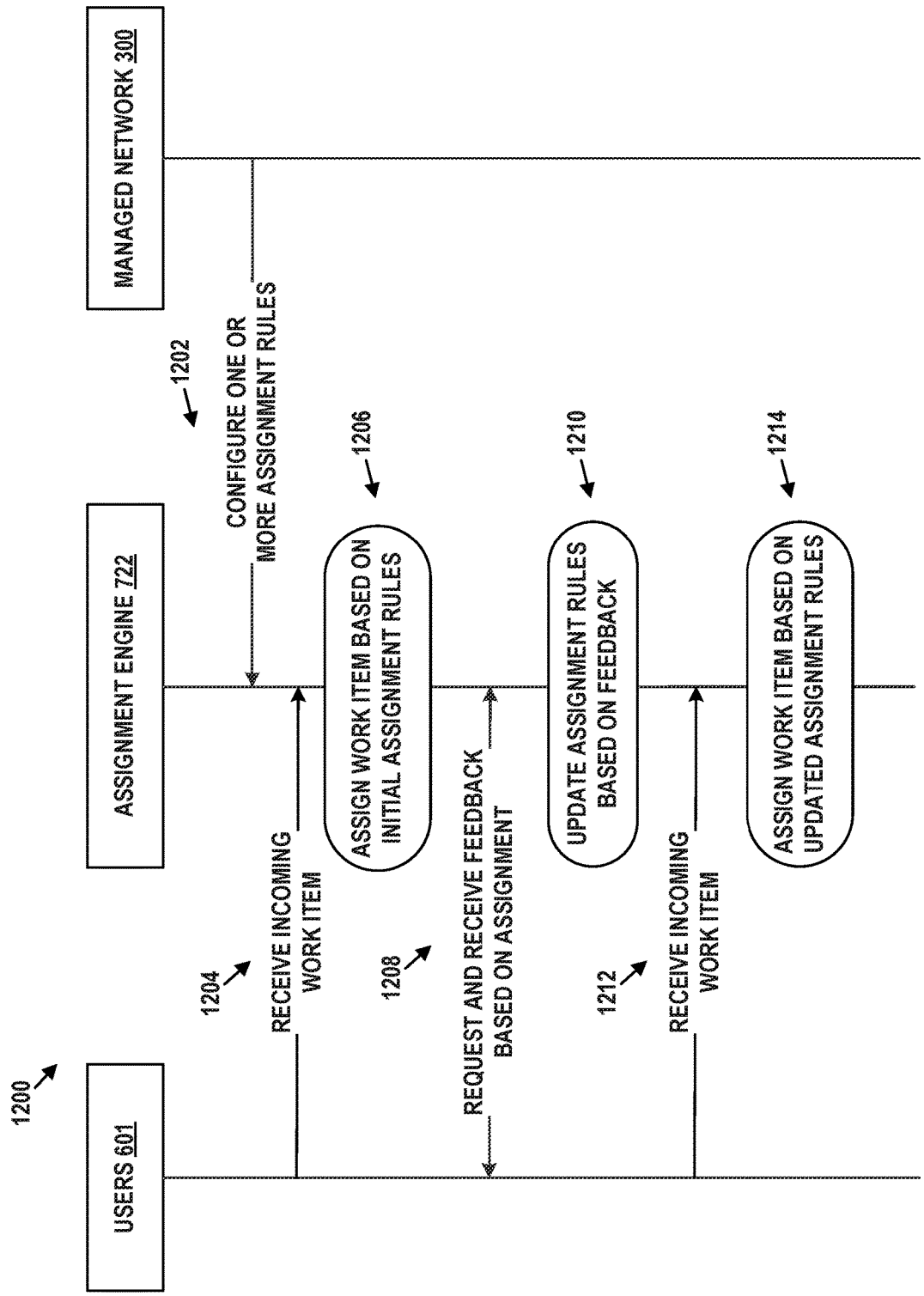
FIG. 12 is a message flow diagram, in accordance with example embodiments

FIG. 12 depicts message flow 1200, in accordance with example embodiments. In message flow 1200, a user from managed network 300 configures one or more assignment rules for assignment engine 722, which in turn receives feedback from users 601 to potentially update the one or more assignment rules and/or the pre-defined ordering of the one or more assignment rules. By way of example, message flow 1200 may utilize managed network 300, assignment engine 722, and users 601 during operation. However, additional components, steps, or blocks, may be added to message flow 1200 without departing from the scope of this disclosure.

At step 1202, a user from managed network 300 provides one or more initial assignment rules to assignment engine 722. This may be accomplished, for example, by a GUI provided by assignment engine 722 (perhaps via computational instance 322) to a user from managed network 300. The GUI may include feature(s) for establishing assignment rules. The user from managed network 300 may provide input into the GUI to specify a respective selection criteria and mapping for a given assignment rule. In some cases, step 1202 may be prompted by the user from managed network 300, for example, by requesting the GUI from computational instance 322.

At step 1204, assignment engine 722 receives an incoming work item from users 601. This work item may include information about the underlying request or issue represented by the work item. For instance, a work item representing a user request may specify information that can assist the agent address and resolve the work item.

At step 1206, assignment engine 722 assigns the work item received at step 1204 by evaluating the assignment rules configured at step 1202.

At step 1208, assignment engine 722 may request feedback from users 601 about the assignment made at step 1206. Requesting feedback may be accomplished, for example, by a GUI provided by assignment engine 722 (perhaps via computational instance 322) to users 601. The GUI may include feature(s) for providing feedback to assignment engine 722. For instance, the GUI may contain data entry fields that allow users 601 to rank the assignment of the work item at step 1210. As a specific example, users 601 may provide a ranking from 1-10, where a high ranking (e.g., 9 or 10) corresponds to a satisfactory assignment at step 1206 (e.g., a user was satisfied with the agent they were assigned to) and a low ranking (e.g., 1 or 2) corresponds to an unsatisfactory assignment at step 1206 (e.g., a user was unsatisfied with the agent they were assigned to). Other methods of providing feedback also exist.

At step 1210, assignment engine 722 may adjust the initial assignment rules configured at step 1202 based on the feedback received at step 1208. For example, if the initial assignment rules had a pre-defined order in which account-based assignment rules were evaluated first and historical-based assignment rules were evaluated second and if feedback provided at step 1208 was that users 601 were unsatisfied with the assignment at step 1206, then assignment engine 722 may adjust the pre-defined order such that historical-based assignment rules are evaluated first and account-based assignment rules are evaluated second. Other adjustments are also possible.

At step 1212, assignment engine 722 receives another incoming work item from users 601. Then, at step 1214, assignment engine 722 assigns the work item received at step 1212 based on the updated assignment rules configured during step 1210.

VII. Example Operations

Figure 13:
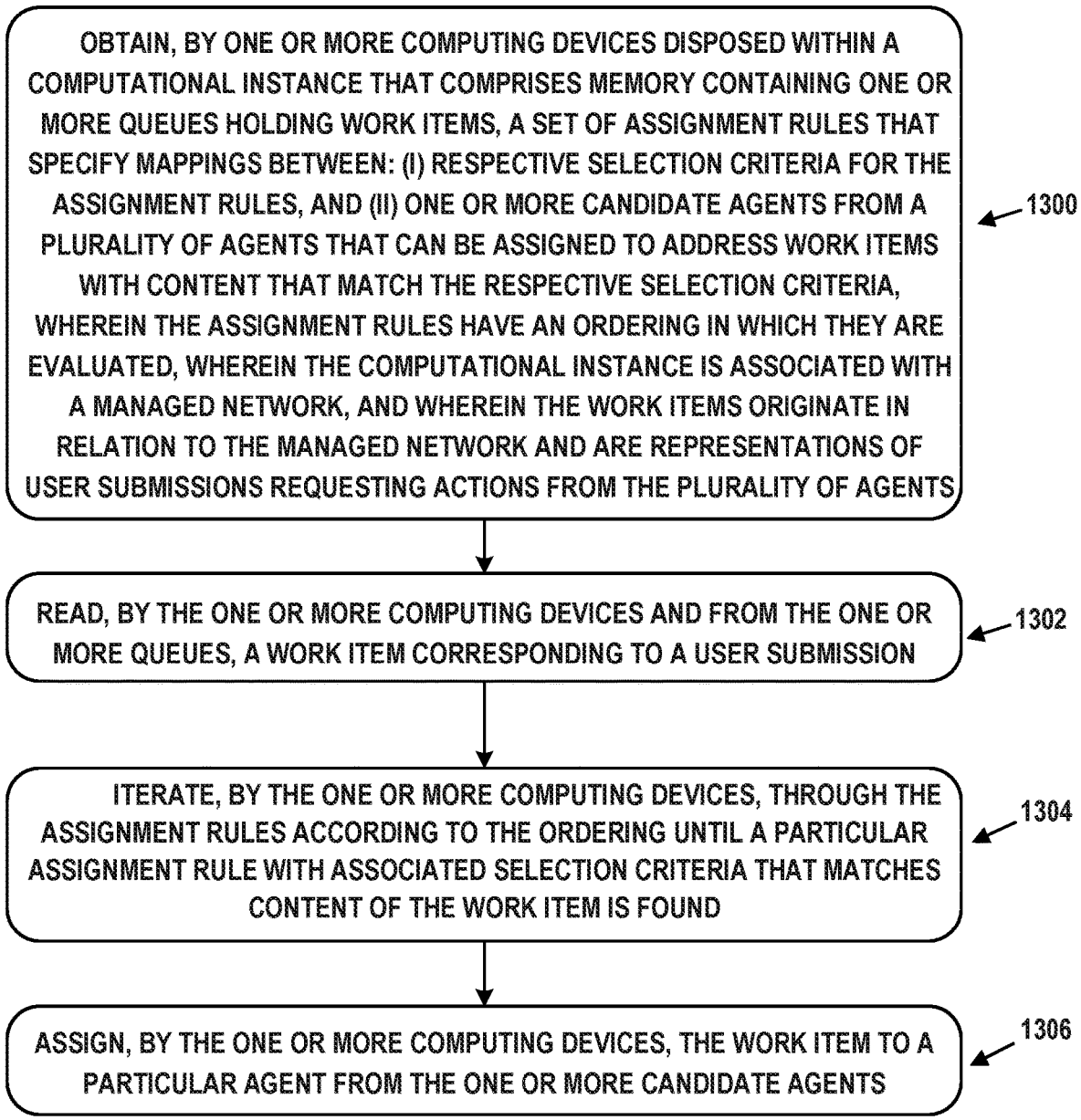
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve obtaining, by one or more computing devices disposed within a computational instance that comprises memory containing one or more queues holding work items, a set of assignment rules that specify mappings between: (i) respective selection criteria for the assignment rules, and (ii) one or more candidate agents from a plurality of agents that can be assigned to address work items with content that match the respective selection criteria. The assignment rules may have an ordering in which they are evaluated. The computational instance may be associated with a managed network. The work items may originate in relation to the managed network and may be representations of user submissions requesting actions from the plurality of agents.

Block 1302 may involve reading, by the one or more computing devices and from the one or more queues, a work item corresponding to a user submission.

Block 1304 may involve iterating, by the one or more computing devices, through the assignment rules according to the ordering until a particular assignment rule with associated selection criteria that matches content of the work item is found.

Block 1306 may involve assigning, by the one or more computing devices, the work item to a particular agent from the one or more candidate agents.

In some embodiments, assigning the work item to the particular agent comprises determining that the particular agent is available to address the work item and in response to the particular agent being available to address the work item, assigning the work item to the particular agent.

In some embodiments, the work item represents a voice call requesting real-time verbal communication with an agent.

In some embodiments, the work item represents a virtual chat requesting online communication with an agent.

In some embodiments, obtaining the set of assignment rules comprises generating one or more graphical user interfaces with data entry elements for the mappings in the assignment rules, providing, to a client device, a representation of the one or more graphical user interfaces, and receiving, from the client device and entered by way of the data entry elements, the mappings in the assignment rules.

In some embodiments, the work items originate from within the managed network.

In some embodiments, the managed network provides services to one or more end-user networks and the work items originate from the one or more end-user networks.

In some embodiments, the assignment rules include at least one account-based assignment rule with account-based selection criteria that evaluate the work item to determine an end-user network of the one or more end-user networks from which a user submission represented by the work item was made. In such embodiments, the one or more candidate agents are associated with the end-user network.

In some embodiments, the assignment rules include at least one case-based assignment rule with case-based selection criteria that evaluate the work item to determine a particular case that is associated with the work item. In such embodiments, the one or more candidate agents are associated with the particular case.

In some embodiments, the assignment rules include at least one case-based assignment rule with case-based selection criteria that evaluate the work item to determine a particular case that is associated with the work item. In such embodiments, the one or more candidate agents were previously associated with cases that have at least a threshold degree of similarity with the particular case.

In some embodiments, the assignment rules include at least one historically-based assignment rule with historically-based selection criteria that evaluate a given work item to determine frequencies in which at least some of the plurality of agents were previously assigned to address past work items submitted by a user that submitted the work item. In such embodiments, the one or more candidate agents were previously assigned to address the past work items.

In some embodiments, the one or more candidate agents were previously assigned to address the past work items more frequently than other agents of the plurality of agents and the past work items were assigned within a most-recent month, quarter, year, or number of days.

In some embodiments, the assignment rules comprise subsets of assignment rules that are evaluated with respect to each of the one or more queues, where the subsets of assignment rules are different from one another.

Some embodiments involve: after assigning the work item to the particular agent, generating one or more graphical user interfaces with data entry elements for feedback related to the work item; providing, to a client device, a representation of the one or more graphical user interfaces; receiving, from the client device and entered by way of the data entry elements, the feedback related to the work item; and based on the feedback related to the work item, updating the assignment rules.

In some embodiments, a system may involve means for obtaining, by one or more computing devices disposed within a computational instance that comprises memory containing one or more queues holding work items, a set of assignment rules that specify mappings between: (i) respective selection criteria for the assignment rules, and (ii) one or more candidate agents from a plurality of agents that can be assigned to address work items with content that match the respective selection criteria. The assignment rules may have an ordering in which they are evaluated. The computational instance may be associated with a managed network. The work items may originate in relation to the managed network and may be representations of user submissions requesting actions from the plurality of agents. The system may also involve means for reading, by the one or more computing devices and from the one or more queues, a work item corresponding to a user submission. The system may also involve means for iterating, by the one or more computing devices, through the assignment rules according to the ordering until a particular assignment rule with associated selection criteria that matches content of the work item is found. The system may also involve means for assigning, by the one or more computing devices, the work item to a particular agent from the one or more candidate agents.

VIII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computational instance disposed within a remote network management platform and associated with a managed network, the computational instance comprising:
  memory containing one or more queues configured to hold work items, wherein the work items originate in relation to the managed network and are representations of user submissions requesting actions from a plurality of agents; and
  one or more computing devices configured to:
    obtain a set of assignment rules that specify mappings between: (i) respective selection criteria for the assignment rules, and (ii) one or more candidate agents from the plurality of agents that can be assigned to address the work items with content that match the respective selection criteria, wherein the assignment rules have a predetermined ordering in which they are evaluated, and wherein the one or more candidate agents comprise at least one virtual agent and at least one human agent;
    read, from the one or more queues, a work item corresponding to a user submission;
    iterate through the assignment rules according to the predetermined ordering until a particular assignment rule with associated selection criteria that matches content of the work item is found;
    assign the work item to a virtual agent of the at least one virtual agent from the one or more candidate agents, wherein the virtual agent is configured to complete at least a portion of the work item;
    determine that the virtual agent has not completed the work item;
    reassign the work item to a human agent of the at least one human agent to complete a remaining portion of the work item in response to determining that the virtual has not completed the work item;
    generate one or more graphical user interfaces with data entry elements configured to receive feedback related to the assignment of the work item;
    provide, to a client device, the one or more graphical user interfaces;
    receive, from the client device, the feedback related to the assignment of the work item provided via the data entry elements of the one or more graphical user interfaces; and
    based on the received feedback, update the predetermined ordering of the assignment rules.

2. The computational instance of claim 1, wherein reassigning the work item to the human agent of the at least one human agent comprises:
  determining that the human agent is available to address the work item; and
  in response to the human agent being available to address the work item, reassigning the work item to the human agent.

3. The computational instance of claim 1, wherein the work item represents a voice call requesting real-time verbal communication with an agent from the one or more candidate agents.

4. The computational instance of claim 1, wherein the work item represents a virtual chat requesting online communication with an agent from the one or more candidate agents.

5. The computational instance of claim 1, wherein the work items originate from within the managed network.

6. The computational instance of claim 1, wherein the managed network provides services to one or more end-user networks and wherein the work items originate from the one or more end-user networks.

7. The computational instance of claim 6, wherein the assignment rules comprise at least one account-based assignment rule with account-based selection criteria that evaluate the work item to determine an end-user network of the one or more end-user networks from which a user submission represented by the work item was made, and wherein the one or more candidate agents are associated with the end-user network.

8. The computational instance of claim 1, wherein the assignment rules comprise at least one case-based assignment rule with case-based selection criteria that evaluate the work item to determine a particular case that is associated with the work item, and wherein the one or more candidate agents are associated with the particular case.

9. The computational instance of claim 1, wherein the assignment rules comprise at least one case-based assignment rule with case-based selection criteria that evaluate the work item to determine a particular case that is associated with the work item, and wherein the one or more candidate agents were previously associated with cases that have at least a threshold degree of similarity with the particular case.

10. The computational instance of claim 1, wherein the assignment rules comprise at least one historically-based assignment rule with historically-based selection criteria that evaluate a given work item to determine frequencies in which at least some of the plurality of agents were previously assigned to address past work items submitted by a user that submitted the given work item, wherein the one or more candidate agents were previously assigned to address the past work items.

11. The computational instance of claim 10, wherein the one or more candidate agents were previously assigned to address the past work items more frequently than other agents of the plurality of agents, and wherein the past work items were assigned within a most-recent month, quarter, year, or number of days.

12. The computational instance of claim 1, wherein the assignment rules comprise subsets of assignment rules that are evaluated with respect to each of the one or more queues, wherein the subsets of assignment rules are different from one another.

13. The computational instance of claim 1, wherein the memory contains one or more channels in which the user submissions are arranged by a type by the one or more computing devices prior to the work items being generated, and wherein each of the one or more channels has a specific respective association with at least one queue of the one or more queues.

14. The computational instance of claim 13, wherein the one or more computing devices are configured to:
  create, prior to creating the work item associated with the user submission, a record based on the user submission;
  determine that the record contains a threshold amount of information to qualify for a channel of the one or more channels;
  assign the record to the channel of the one or more channels based on the type of the user submission and based on the record containing the threshold amount of information;
  obtain, prior to obtaining the set of assignment rules, a set of routing rules that specify additional mappings between the one or more channels and the one or more queues;

update the record into the work item in response to the record being assigned to the channel; and assign the work item to a queue of the one or more queues based on the set of routing rules.

15. A computer-implemented method, comprising:

obtaining, by one or more computing devices disposed within a computational instance that comprises memory containing one or more queues holding work items, a set of assignment rules that specify mappings between: (i) respective selection criteria for the assignment rules, and (ii) one or more candidate agents from a plurality of agents that can be assigned to address work items with content that match the respective selection criteria, wherein the one or more candidate agents comprise at least one virtual agent and at least one human agent, wherein the assignment rules have a predetermined ordering in which they are evaluated, wherein the computational instance is associated with a managed network, and wherein the work items originate in relation to the managed network and are representations of user submissions requesting actions from the plurality of agents;

reading, by the one or more computing devices and from the one or more queues, a work item corresponding to a user submission;

iterating, by the one or more computing devices, through the assignment rules according to the predetermined ordering until a particular assignment rule with associated selection criteria that matches content of the work item is found;

assigning, by the one or more computing devices, the work item to a virtual agent of the at least one virtual agent from the one or more candidate agents to complete at least a portion of the work item;

determining, by the one or more computing devices, that the virtual agent has not completed the work item;

reassigning, by the one or more computing devices, the work item to a human agent of the at least one human agent to complete a remaining portion of the work item in response to determining that the virtual agent has not completed the work item;

generating, by the one or more computing devices, one or more graphical user interfaces with data entry elements configured to receive feedback related to the assignment of the work item;

providing, to a client device, the one or more graphical user interfaces;

receiving, from the client device, the feedback related to the assignment of the work item provided via the data entry elements of the one or more graphical user interfaces; and based on the received feedback, updating the predetermined ordering of the assignment rules.

16. The computer-implemented method of claim 15, wherein the assignment rules comprise at least one account-based assignment rule with account-based selection criteria that evaluate the work item to determine an end-user network of one or more end-user networks from which a user submission represented by the work item was made, and wherein the one or more candidate agents are associated with the end-user network.

17. The computer-implemented method of claim 15, wherein the assignment rules comprise at least one case-based assignment rule with case-based selection criteria that evaluate the work item to determine a particular case that is associated with the work item, and wherein the one or more candidate agents are associated with the particular case.

18. The computer-implemented method of claim 15, wherein the assignment rules comprise at least one case-based assignment rule with case-based selection criteria that evaluate the work item to determine a particular case that is associated with the work item, and wherein the one or more candidate agents were previously associated with cases that have at least a threshold degree of similarity with the particular case.

19. The computer-implemented method of claim 15, wherein the assignment rules comprise at least one historically-based assignment rule with historically-based selection criteria that evaluate a given work item to determine frequencies in which at least some of the plurality of agents were previously assigned to address past work items submitted by a user that submitted the work item, wherein the one or more candidate agents were previously assigned to address the past work items.

20. An article of manufacture including a non-transitory computer-readable medium, having stored thereon program instructions that, upon execution by a computing system disposed within a computational instance that comprises memory containing one or more queues configured to hold work items, cause the computing system to perform operations comprising:

obtaining a set of assignment rules that specify mappings between: (i) respective selection criteria for the assignment rules, and (ii) one or more candidate agents from a plurality of agents that can be assigned to address the work items with content that match the respective selection criteria, wherein the one or more candidate agents comprise at least one virtual agent and at least one human agent, wherein the assignment rules have a predetermined ordering in which they are evaluated, wherein the computational instance is disposed within a remote network management platform and is associated with a managed network, and wherein the work items originate in relation to the managed network and are representations of user submissions requesting actions from the plurality of agents;

reading, from the one or more queues, a work item corresponding to a user submission;

iterating through the assignment rules according to the predetermined ordering until a particular assignment rule with associated selection criteria that matches content of the work item is found;

assigning the work item to a virtual agent of the at least one virtual agent from the one or more candidate agents, wherein the virtual agent is configured to complete at least a portion of the work item;

determining that the virtual agent has not completed the work item;

reassigning the work item to a human agent of the at least one human agent to complete a remaining portion of the work item in response to determining that the virtual agent has not completed the work item;

generating one or more graphical user interfaces with data entry elements configured to receive feedback related to the assignment of the work item;

providing, to a client device, the one or more graphical user interfaces;

receiving, from the client device, the feedback related to the assignment of the work item provided via the data entry elements of the one or more graphical user interfaces; and based on the received feedback, updating the predetermined ordering of the assignment rules.

\* \* \* \* \*